US006551955B1

(12) United States Patent
Diefenbach

(10) Patent No.: US 6,551,955 B1
(45) Date of Patent: Apr. 22, 2003

(54) PARTICULATE GROUP 4 METALLOCENE-ALUMINOXANE CATALYST COMPOSITIONS DEVOID OF PREFORMED SUPPORT, AND THEIR PREPARATION AND THEIR USE

(75) Inventor: Steven P. Diefenbach, Baton Rouge, LA (US)

(73) Assignee: Albemarle Corporation, Richmond, VA (US)

(*) Notice: Subject to any disclaimer, the term of this patent is extended or adjusted under 35 U.S.C. 154(b) by 0 days.

(21) Appl. No.: 09/596,953

(22) Filed: Jun. 16, 2000

Related U.S. Application Data

(60) Continuation-in-part of application No. 09/571,480, filed on May 16, 2000, and a continuation-in-part of application No. 09/571,542, filed on May 16, 2000, now Pat. No. 6,294,496, said application No. 09/571,480, filed on May 16, 2000, is a division of application No. 08/986,824, filed on Dec. 8, 1997, now abandoned.

(51) Int. Cl.⁷ .............................. B01J 31/22; C08F 4/64
(52) U.S. Cl. ..................... 502/108; 502/118; 502/152; 526/160; 526/165; 526/943
(58) Field of Search ................. 502/108, 118, 502/152; 526/160, 165, 943

(56) References Cited

U.S. PATENT DOCUMENTS

| | | | |
|---|---|---|---|
| 4,701,432 A | 10/1987 | Welborn, Jr. | 502/113 |
| 4,752,597 A | 6/1988 | Turner | 502/104 |
| 4,767,735 A | 8/1988 | Ewen et al. | 502/109 |
| 4,791,180 A | 12/1988 | Turner | 526/160 |
| 4,871,705 A | 10/1989 | Hoel | 502/117 |
| 4,892,851 A | 1/1990 | Ewen et al. | 502/104 |
| 4,923,833 A | 5/1990 | Kioka et al. | 502/9 |
| 4,939,217 A | 7/1990 | Stricklen | 526/114 |
| 4,975,403 A | 12/1990 | Ewen | 502/113 |
| 4,978,730 A | 12/1990 | Maezawa et al. | 526/153 |
| 5,001,205 A | 3/1991 | Hoel | 526/128 |
| 5,017,714 A | 5/1991 | Welborn, Jr. | 556/12 |
| 5,071,808 A | 12/1991 | Antberg et al. | 502/107 |
| 5,106,804 A | 4/1992 | Bailly et al. | 502/108 |
| 5,120,867 A | 6/1992 | Welborn, Jr. | 556/12 |
| 5,124,418 A | 6/1992 | Welborn, Jr. | 526/114 |
| 5,126,301 A | 6/1992 | Tsutsui et al. | 502/108 |
| 5,145,819 A | 9/1992 | Winter et al. | 502/117 |
| 5,153,157 A | 10/1992 | Hlatky et al. | 502/117 |
| 5,169,818 A | 12/1992 | Antberg et al. | 502/159 |
| 5,198,401 A | 3/1993 | Turner et al. | 502/155 |
| 5,227,440 A | 7/1993 | Canich et al. | 526/129 |
| 5,229,478 A | 7/1993 | Floyd et al. | 526/160 |
| 5,240,894 A | 8/1993 | Burkhardt et al. | 502/108 |
| 5,276,208 A | 1/1994 | Winter et al. | 556/53 |
| 5,283,300 A | 2/1994 | Haspeslagh et al. | 526/75 |
| 5,308,815 A | 5/1994 | Sangokoya | 502/104 |
| 5,308,816 A | 5/1994 | Tsutsui et al. | 502/108 |
| 5,308,817 A | 5/1994 | Reddy et al. | 502/117 |
| 5,387,567 A | 2/1995 | Tajima et al. | 502/103 |
| 5,439,995 A * | 8/1995 | Bailly et al. | 526/125 |
| 5,466,766 A | 11/1995 | Patsidis et al. | 502/117 |
| 5,492,978 A | 2/1996 | Peifer et al. | 502/117 |
| 5,498,581 A | 3/1996 | Welch et al. | 502/102 |
| 5,527,930 A | 6/1996 | Sangokoya | 556/179 |
| 5,541,350 A | 7/1996 | Murata et al. | 556/10 |
| 5,585,508 A | 12/1996 | Kuber et al. | 556/11 |
| 5,643,845 A | 7/1997 | Tajima et al. | 502/103 |
| 5,648,310 A | 7/1997 | Wasserman et al. | 502/120 |
| 5,714,425 A | 2/1998 | Chabrand et al. | 502/103 |
| 5,726,264 A | 3/1998 | Jung et al. | 502/108 |
| 5,733,834 A | 3/1998 | Soga et al. | 502/117 |
| 5,739,368 A | 4/1998 | Krzystowczyk et al. | 502/117 |
| 5,747,405 A | 5/1998 | Little et al. | 502/117 |
| 5,759,940 A | 6/1998 | Sacchetti et al. | 502/134 |
| 5,770,755 A | 6/1998 | Schertl et al. | 502/103 |
| 5,854,363 A | 12/1998 | Jung et al. | 502/103 |
| 5,883,275 A | 3/1999 | Bingel et al. | 502/103 |
| 5,919,877 A | 7/1999 | Tanaglia | 526/153 |
| 6,166,152 A * | 12/2000 | Benham et al. | 526/64 |
| 6,187,880 B1 * | 2/2001 | Welch et al. | 526/75 |

FOREIGN PATENT DOCUMENTS

| | | |
|---|---|---|
| EP | 0586167 | 3/1994 |
| EP | 0586168 | 3/1994 |
| EP | 0685495 | 12/1995 |
| EP | 0751155 | 1/1997 |
| WO | 9518836 | 7/1995 |
| WO | 9526369 | 10/1995 |
| WO | 9852686 | 11/1998 |

OTHER PUBLICATIONS

Braca, G. et al., "Organometallic nickel catalysts bound ot polymeric matrices in the oligomerization and/or polymerization of olefins with a replica of the support morphology", J. Mol. Catal. (1992), 74(1–3), pp. 421–431.

Braca, G. et al., "Organometallic nickel catalysts anchored on polymeric matrices in the oligomerization and/or polymerization of olefins. Part II. Effect and role of the components of the catalytic system", J. Mol. Catal. A: Chem. (1995), 96(3), pp. 203–213.

Xie, Tuyu, et al., "Gas Phase Ethylene Polymerization: Production Processes, Polymer Properties, and Reactor Modeling", Ind. Eng. Chem. Res. (1994), 33(3), pp. 449–479.

Antberg, M. et al., "Stereospecific polymerizations with metallocene catalysts: products and technological aspects", Makromol. Chem., Macromol. Symp. (1991), 48/49, pp. 333–347.

* cited by examiner

*Primary Examiner*—Caixia Lu
(74) *Attorney, Agent, or Firm*—Philip M. Pippenger

(57) ABSTRACT

Described are solid olefin polymerization catalysts that have, inter alia, very high productivities as shown by a standard test procedure for measuring this property or characteristic, and excellent morphology. Such particulate catalysts can be prepared by prepolymerizing a controlled amount of vinylolefin with a Group 4 metallocene-aluminoxane solution, in which the original metallocene ingredient used in the process has in its molecular structure at least one polymerizable olefinic substituent. These particulate catalysts do not contain, and thus are not produced in the presence of, a preformed support such as an inorganic compound (silica or etc.) or a preformed particulate polymeric support.

19 Claims, No Drawings

PARTICULATE GROUP 4 METALLOCENE-ALUMINOXANE CATALYST COMPOSITIONS DEVOID OF PREFORMED SUPPORT, AND THEIR PREPARATION AND THEIR USE

This is a continuation-in-part of my prior commonly-owned application Ser. No. 09/571,480, filed May 16, 2000, and Ser. No. 09/571,542, filed May 16, 2000, now U.S. Pat. No. 6,294,496 B1, the entire disclosures of both of which, including the claims thereof, are incorporated herein by reference, said application Ser. No. 09/571,480 in turn being a division of my prior commonly-owned application Ser. No. 08/986,824, filed Dec. 8, 1997 and now abandoned, and said application Ser. No. 09/571,542, now U.S. Pat. No. 6,294,496 B1, in turn being a continuation-in-part of my prior commonly-owned application Ser. No. 08/986,824, filed Dec. 8, 1997 and now abandoned.

TECHNICAL FIELD

This invention relates to novel, highly effective solid aluminoxane/metallocene olefin polymerization catalysts, their preparation, and their use.

BACKGROUND

Hydrocarbylaluminoxanes (also known as alumoxanes) complexed with transition metal compounds, such as metallocenes, have been found to be effective olefin polymerization catalysts. Methylaluminoxanes are especially effective catalyst components in forming homogeneous catalyst systems with various metallocenes. However, these catalyst systems have proven to be considerably less effective in productivity per unit weight of catalyst when used as supported heterogeneous catalysts, either in the form of dispersions in a liquid medium or as supported solid catalysts in gas-phase polymerizations. For example, in U.S. Pat. No. 5,126,301 issued Jun. 30, 1992 to Tsutsui et al. it is pointed out that when an olefin is polymerized or copolymerized in a dispersion or gas-phase polymerization system by utilizing carrier-supported metallocene-aluminoxane catalysts, polymerization activity is markedly reduced, that the properties inherent to the catalyst comprising the transition metal compound and the aluminoxane catalyst component are not fully exerted, and that powder properties such as bulk density of the thus prepared polymer were insufficient. The approach taken by Tsutsui et al. was to form a solid catalyst by contacting an α-olefin with a mixture obtained by mixing an organoaluminum compound having a branched alkyl radical, an aluminoxane of specified aluminum content, a fine-particle carrier, and a transition metal metallocene compound.

Despite various improvements made during the course of extensive research activities by various laboratories, a need has existed for olefin polymerization catalysts having even better performance characteristics. For example, U.S. Pat. No. 5,498,581 issued Mar. 12, 1996 to Welch et al., points out that evaluation of attempts disclosed in U.S. Pat. Nos. 5,240,894; 4,871,705; and 5,106,804 to overcome the disadvantages of metallocene catalysts has revealed that there is still room for improvement, particularly when the catalyst is one which is to be used in a slurry-type polymerizations. The techniques disclosed in U.S. Pat. Nos. 5,240,894; 4,871,705; and 5,106,804 involve prepolymerization of the metallocene-aluminoxane catalyst system either in the presence or absence of a support.

The improved method of Welch et al. U.S. Pat. No. 5,498,581 for preparing a solid metallocene-containing catalyst system comprises (a) combining in a liquid an organoalu-minoxane and at least one metallocene having at least one cyclopentadienyl, indenyl, tetrahydroindenyl, octahydrofluorenyl, or fluorenyl ligand having at least one olefinically unsaturated substituent to form a liquid catalyst system, (b) conducting prepolymerization of at least one olefin in the presence of said catalyst system to produce a prepolymerized solid catalyst containing no more than about 95 weight percent prepolymer, and (c) separating the resulting solid from the liquid and components dissolved in the liquid. The patent reports in Table I that by use of the Welch et al. method, catalysts having productivities as high as 9840 grams of polyethylene per gram of catalyst per hour were formed.

SUMMARY OF THE INVENTION

This invention provides solid olefin polymerization catalysts that are believed to have substantially higher productivities than any previously-known heterogeneous olefin catalyst or catalyst system devoid of an inorganic support and any other kind of preformed support. In addition, the polymerization catalysts of this invention possess a variety of beneficial morphological characteristics, such as for example an average (mean) particle size in the range of about 20 to about 60 microns, and a desirably narrow particle size distribution, e.g., a mean:median particle size ratio in the range of about 0.7:1 to about 1.5:1, and preferably in the range of about 0.8:1 to about 1.3:1. In fact it has been found possible to provide self-supported catalysts of this invention (i.e., particulate catalysts which are not formed using a preexisting support such as silica or preformed polyolefin particles) in which the mean:median particle size ratio is in the exceptionally narrow range of about 0.9:1 to about 1.1:1.

In addition to productivities of at least 12,000 grams of polyethylene per gram of catalyst in one hour under test conditions described hereinafter, this invention thus makes possible the provision of catalysts that have excellent morphology and handling characteristics, and that are capable of producing olefin homopolymers and copolymers having a combination of very desirable physical attributes and properties. In fact, the morphology of the particulate catalysts formed in the preferred manner of this invention is comparable to (on a par with) the best particulate catalysts previously made in these laboratories or received heretofore from outside sources. It is worth observing that such prior catalysts were formed using a silica support.

In accordance with another embodiment of this invention there is provided a particulate vinylolefin prepolymer-Group 4 metallocene-aluminoxane catalyst composition having (i) a productivity of at least 15,000 grams, and preferably at least 18,000 grams, of polyethylene per gram of catalyst in one hour, (ii) an average particle size in the range of about 20 to about 60 microns, and preferably in the range of about 22 to about 55 microns, and a mean:median particle size ratio in the range of about 0.7:1 to about 1.5:1, and preferably in the range of about 0.8:1 to about 1.3:1. More preferably the self-supported catalysts of this embodiment of the invention have a mean:median particle size ratio in the range of about 0.9:1 to about 1.1:1.

Preferred catalysts are those in which this productivity characteristic is at least 25,000, and particularly preferred catalysts are those in which this productivity characteristic is at least 30,000.

It has been discovered that particulate olefin polymerization catalysts having such exceptionally high productivities and desirable morphology can be prepared by prepolymerizing at least one vinylolefin, preferably a gaseous 1-alkene, with a Group 4 metallocene-aluminoxane solution, provided the proportion of vinylolefin (most preferably, ethylene) relative to the Group 4 metallocene(s) used in forming the solution is suitably controlled. Typically these reactants are proportioned so that the prepolymerized catalyst composition contains (i.e., is formed by prepolymerization of) from about 150 to about 1500, and preferably in the range of about 175 to about 1000, moles of vinylolefin per mole of metallocene. It is also important in carrying out this process to use a solution in which the atom ratio of aluminum to Group 4 metal in the solution is within a suitable range, e.g., in a range of at least about 50:1 or more usually at least about 100:1, and in either case up to about 1500:1, or more usually up to about 1000:1. Typically the atom ratio of aluminum to Group 4 metal is the range of about 150:1 to about 1500:1, and preferably in the range of about 175:1 to about 1000:1. In addition, the Group 4 metallocene ingredient used in forming these new, highly productive catalysts has in its molecular structure at least one polymerizable olefinic substituent. Of these Group 4 metallocenes, the zirconium metallocenes are most preferred, especially those containing two cyclopentadienyl moiety-containing groups in the molecule. These two groups can be unbridged, but preferably are connected to each other by a bridging group.

Another feature of these catalysts is that they are self-supporting catalysts. By this is meant that the catalyst particles do not contain, and thus are not produced in the presence of, a preformed support such as an inorganic compound (silica or etc.) or a preformed particulate polymeric support. Instead, the prepolymer is formed in the presence of the combination of at least one Group 4 metallocene and at least one aluminoxane in an initially homogeneous liquid organic solvent phase from which the catalyst particles precipitate, wherein such combination is in whatever chemical composition or makeup it assumes or acquires when the metallocene and the aluminoxane are brought together in the solvent. According to the present state of knowledge in the art, when a metallocene and an aluminoxane are brought together in an inert organic solvent they are understood to undergo chemical reaction with each other to thereby form a reaction product. Accordingly, in accordance with the present state of knowledge in the art, the prepolymer of the catalyst compositions of this invention is believed to be formed in the presence of the reaction product of at least one Group 4 metallocene and at least one aluminoxane in an initially homogeneous organic liquid solvent phase from which the catalyst particles precipitate. Some excess aluminoxane may also be present.

A further embodiment of this invention is a self-supported vinylolefin-prepolymerized Group 4 metallocene-aluminoxane particulate catalyst composition devoid of a preformed support and that has (i) a productivity of at least 12,000, more desirably at least 15,000, and still more desirably at least 18,000, grams of polyethylene per gram of catalyst if and when tested as described herein, and (ii) a particle size distribution in which 75% of the catalyst has a particle size below 70 microns and 25% of the catalyst has a particle size of 70 microns or above, in which 50% of the catalyst has a particle size below about 62 microns and 50% of the catalyst has a particle size of 62 microns or above, in which 25% of the catalyst has a particle size below 45 microns and 75% of the catalyst has a particle size of 45 microns or above, and in which no more than 5%, and preferably no more than about 2%, of the catalyst has a particle size above 400 microns. More preferably, no more than 3%, and still more preferably no more than about 1%, of the catalyst has a particle size above 300 microns. All percentages given in this paragraph are volume percentages. Preferably, the self-supported vinylolefin-prepolymerized Group 4 metallocene-aluminoxane particulate catalyst compositions devoid of a preformed support referred to in this paragraph are self-supported ethylene-prepolymerized Group 4 metallocene-aluminoxane particulate catalyst compositions devoid of a preformed support, and even more preferably, the Group 4 metal in the metallocene is zirconium. Still more preferably, there is only a single atom of zirconium in the molecule of the zirconium metallocene before it is used in the formation of these catalyst compositions.

In preferred embodiments, the above catalysts of this invention have a specific surface area of no more than about 20 square meters per gram ($m^2/g$); and preferably less than 10 $m^2/g$.

In other preferred embodiments, there is provided a self-supported vinylolefin-prepolymerized Group 4 metallocene-aluminoxane particulate catalyst composition devoid of a preformed support and having a particle size distribution in which 90% of the catalyst has a particle size below 80 microns and 10% of the catalyst has a particle size of 80 microns or above, in which 75% of the catalyst has a particle size below 70 microns and 25% of the catalyst has a particle size of 70 microns or above, in which 50% of the catalyst has a particle size below about 62 microns and 50% of the catalyst has a particle size of 62 microns or above, in which 25% of the catalyst has a particle size below 45 microns and 75% of the catalyst has a particle size of 45 microns or above, and in which 10% of the catalyst has a particle size below 25 microns and 90% of the catalyst has a particle size of 25 microns or above, all such percentages being by volume. In another preferred embodiment these self-supported vinylolefin-prepolymerized Group 4 metallocene-aluminoxane particulate catalyst compositions devoid of a preformed support have, in addition to such particle size distributions, an average (mean) particle size in the range of about 20 to about 60 microns. Preferably, the self-supported vinylolefin-prepolymerized Group 4 metallocene-aluminoxane particulate catalyst compositions devoid of a preformed support referred to in this paragraph are self-supported ethylene-prepolymerized Group 4 metallocene-aluminoxane particulate catalyst compositions devoid of a preformed support, and even more preferably, the Group 4 metal in the metallocene is zirconium. Still more preferably, there is only a single atom of zirconium in the molecule of the zirconium metallocene before it is used in the formation of these catalyst compositions.

The catalyst compositions described in the immediately preceding paragraph typically have a productivity of at least 12,000, more desirably at least 15,000, and still more desirably at least 18,000, grams of polyethylene per gram of catalyst if and when tested as described herein. A few instances wherein the productivity of the catalyst was below these values, e.g., 8400 or 7200 grams of polyethylene per gram of catalyst are deemed anomalous results.

To test for productivity, a fresh catalyst is tested in slurry form for productivity with ethylene in a 2-liter autoclave that has been precharged with about one liter of isobutane and that is charged with ethylene to a total pressure of 450 psig at 91.5° C., for one hour. The amount in grams of dried polyethylene produced in under these conditions per gram of the catalyst constitutes the productivity of the catalyst.

A preferred method for producing the highly productive catalysts of this invention is a process which comprises:

a) mixing together in an organic solvent medium at least one metallocene, preferably a metallocene of a Group 4 metal, and at least one aluminoxane, preferably a methylaluminoxane to form a catalytic solution; and b) contacting catalytic solution from a) with a controlled amount of vinylolefin monomer, preferably ethylene, under polymerization conditions such that particulate solids are formed having a specific surface area of no more than about 20 square meters per gram (m²/g).

When performed properly, the recovered and dried catalyst has a productivity of at least 18,000 grams of polyethylene per gram of catalyst in one hour.

It is interesting to compare the unsupported catalysts of this invention and the productivity thereof with the catalysts and productivity ("polymerization activity") of the catalysts reported in U.S. Pat. No. 4,923,833 issued to Kioka et al. on May 8, 1990. Unlike the present invention, Kioka et al. produce solid unsupported catalysts by (a) contacting a solution of an aluminoxane in a first solvent with a second solvent in which the aluminoxane is insoluble or sparingly soluble, to precipitate solid aluminoxane to form a suspension, and (b) contacting the resulting suspension of solid aluminoxane with a solution of a compound of a Group 4 metal, such as a metallocene thereof, in a third solvent, to form solid fine particles. Thereafter ethylene is fed to the solution to effect prepolymerization. Thus the Kioka et al. solid particles are formed first by precipitating the aluminoxane as solid particles and then causing the interaction between the metallocene and the aluminoxane. In contrast, the present invention involves interacting the metallocene and the aluminoxane in solution, and introducing a controlled amount of ethylene or other vinyl monomer to cause formation of solid particles in the liquid medium. The highest productivity shown in the Kioka et al. patent for their catalysts is in Example 6 wherein the productivity ("polymerization activity") was 27,100 g PE/mM Zr in a slurry polymerization process in which an ethylene-4-methyl-1-pentene copolymer was produced. When expressing productivity on the same basis as used by Kioka et al., the catalysts of the present invention have a "polymerization activity" of at least about 600,000 g PE/mM Zr.

Other embodiments and features of the invention will become still further apparent from the ensuing description and appended claims.

FURTHER DETAILED DESCRIPTION

Aluminoxanes

Hydrocarbylaluminoxanes are formed by the partial hydrolysis of hydrocarbyl-aluminum compounds and, especially, trialkylaluminums such as trimethylaluminum.

Hydrocarbylaluminoxanes may exist in the form of linear, cyclic, caged or polymeric structures with the simplest monomeric compounds being a tetraalkylaluminoxane such as tetramethylaluminoxane of the formula (CH₃)₂AlOAl(CH₃)₂, or tetraethylaluminoxane of the formula (C₂H₅)₂AlOAl(C₂H₅)₂. The compounds preferred for use in olefin polymerization catalysts are oligomeric materials, sometimes referred to as polyalkylaluminoxanes, which usually contain about 4 to 20 of the repeating units:

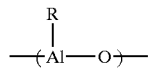

where R is $C_1$–$C_{10}$ alkyl. Especially preferred are polymethylaluminoxanes (MAOs).

Although the linear and cyclic aluminoxanes are often noted as having the structures

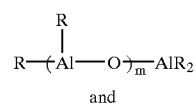

and

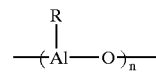

where m and n are integers of 4 or more, the exact configuration of the aluminoxanes remains unknown.

Methylaluminoxanes can contain some higher alkyl groups to improve their solubility. Such modified methylaluminoxanes are described, for example, in U.S. Pat. No. 5,157,008. Besides MAO, non-limiting examples of hydrocarbylaluminoxanes for use in the invention include ethylaluminoxane (EAO), isobutylaluminoxane (IBAO), n-propylaluminoxane, n-octylaluminoxane, and the like. The hydrocarbylaluminoxanes can also contain up to about 20 mole percent (based on aluminum) of moieties derived from amines, alcohols, ethers, esters, phosphoric and carboxylic acids, thiols, alkyl disiloxanes and the like to improve their activity, solubility and/or stability.

The aluminoxanes can be prepared as known in the art by the partial hydrolysis of trialkylaluminum compounds. The trialkylaluminum compounds can be hydrolyzed by reacting them with either free water or water containing solids, which can be either hydrates or porous materials which have absorbed water. Because it is difficult to control the reaction by adding water per se, even with vigorous agitation of the mixture, the free water is usually added in the form of a solution or a dispersion in an organic solvent. Suitable hydrates include salt hydrates such as, for example, $CuSO_4.5H_2O$, $Al_2(SO_4)_3.18H_2O$, $FeSO_4.7H_2O$, $AlCl_3.6H_2O$, $Al(NO_3)_3.9H_2O$, $MgSO_4.7H_2O$, $MgCl_2.6H_2O$, $ZnSO_4.7H_2O$, $Na_2SO_4.10H_2O$, $Na_3PO_4.12H_2O$, $LiBr.2H_2O$, $LiCl.1H_2O$, $LiI.2H_2O$, $LiI.3H_2O$, $KF.2H_2O$, $NaBr.2H_2O$ and the like and alkali metal or alkaline earth metal hydroxide hydrates such as, for example, $NaOH.H_2O$, $NaOH.2H_2O$, $Ba(OH)_2.8H_2O$, $KOH.2H_2O$, $CsOH.1H_2O$, $LiOH.1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4, with ratios of from about 4:3 to 1:3.5 being preferred.

Such hydrocarbylaluminoxanes and processes for preparing hydrocarbylaluminoxanes are described, for example, in U.S. Patent Nos. 4,908,463; 4,924,018; 5,003,095; 5,041,583; 5,066,631; 5,099,050; 5,157,008; 5,157,137; 5,235,081; 5,248,801, and 5,371,260, whose entire teachings are incorporated herein by reference. The methylaluminoxanes contain varying amounts, of from about 5 to 35 mole percent, of the aluminum value as unreacted trimethylaluminum. Preferably, the aluminum content as trimethyl aluminum is less than about 23 mole percent of the total aluminum value, and, more preferably, less than about 20 mole percent.

The aluminoxanes can be used as supplied or they can be subjected to a heat treatment prior to being used in forming the catalyst compositions of this invention. While it may be possible to heat treat the aluminoxane while in neat form, it is preferable to heat a solution or slurry of one or more aluminoxanes, preferably methylaluminoxane, in a suitable inert anhydrous solvent such as a hydrocarbon solvent. Paraffinic and cycloparaffinic hydrocarbon solvents which can be used to form solutions or slurries of the aluminoxanes include pentane, isopentane, hexane, cyclohexane, heptane, octane, decane, dodecane, hexadecane, and the like, with those having carbon numbers of 5 to 10 being preferred. Liquid mononuclear aromatic hydrocarbons which can be used include such solvents as benzene, toluene, one or more xylenes, cumene, ethylbenzene, mesitylene, and aromatic hydrocarbon mixtures or blends such as aromatic naphthas, BTX, aromatic gasoline fractions, with those having carbon numbers of 6 to 20 being preferred. As a class, the aromatic solvents are preferred.

When utilizing previously heat-treated aluminoxanes in forming the particulate catalysts of this invention, it is desirable to use one or more aluminoxanes that have been heat treated while in a hydrocarbon solution which, before heat treatment, contains at least about 5 wt % and up to about 50 wt % or more, preferably in the range of about 10 to about 40 wt %, and more preferably in the range of about 25 to about 30 wt % of one or more hydrocarbylaluminoxanes, especially methylaluminoxane, in whatever form or composition such compounds exist while in such solution. The solvent is usually a paraffinic, cycloparaffinic and/or aromatic solvent, and most preferably is a liquid mononuclear aromatic hydrocarbon solvent (e.g., toluene or xylene). Heating the solution at a temperature of at least about 40° C. for a suitable period of time can increase the productivity of catalyst compositions of this invention made using such heat-treated aluminoxane(s). It has been observed that by heating a visually clear solution of a freshly-produced methylaluminoxane in an aromatic solvent such as toluene at a temperature of at least about 40° C., and preferably at least about 70° C., for a suitable period of time the resultant solution, when chilled to a suitably low temperature such as −15° C. for about 8 hours, will contain a visually perceptible amount of gel whereas the same methylaluminoxane solution which has not been heat treated does not exhibit visually perceptible gel formation when chilled in the same manner. Similarly, such heat treatment, if applied to an aged methylaluminoxane-toluene solution which already contains a visually perceptible amount of gel, tends to result in an increased amount of visually perceptible gel content after maintaining the heat treated solution at −15° C. for 8 hours. At present it is not known exactly what is taking place during the heating of the aluminoxane solution, or why the resultant heat-treated aluminoxane solution can increase the activity of catalyst compositions made therefrom.

Aluminoxane heat treatment temperatures in the range of about 40 up to about 130° C. are typical, and the preferred temperatures, especially when heat-treating methylaluminoxanes, are in the range of about 70 to about 90° C. The duration of the time periods during which the aluminoxane is heated will vary depending chiefly upon the temperature(s) being used and the concentration of the initial aluminoxane solution; in general the higher the temperature and/or concentration, the shorter the time. Typically the time periods will fall in the range of about 0.5 to about 72 hours and with preferred temperatures and aluminoxane concentrations, time periods in the range of about 1 to about 12 hours will normally suffice. For example, with 30 wt % methylaluminoxane solutions in toluene or equivalent aromatic solvent, heating at 80° C. for from about 2 to about 12 hours is a preferred way to operate. It will be understood that on the basis of this disclosure, departures from the foregoing ranges of temperatures, times and/or initial aluminoxane concentrations may be made whenever deemed necessary or desirable.

Metallocenes

As used in the specification and claims, the term "metallocene" includes metal derivatives which contain at least one cyclopentadienyl moiety. The metallocenes used in forming the self-supported, solid catalysts of this invention are those having at least one, and most preferably only one, polymerizable olefinic substituent such as a hydrocarbyl group having a terminal carbon-to-carbon double bond in the molecule. Such substituent(s) can be present (a) on a cyclopentadienyl, indenyl, fluorenyl, tetrahydroindenyl, benzoindenyl or like cyclopentadienyl-moiety-containing group of the metallocene, (b) on a bridging group linking a pair of cyclopentadienyl-moiety-containing groups together in the metallocene, (c) on the Group 4 metal atom of the metallocene, or (d) on any two or more of (a), (b), and (c). Examples of such terminal olefinically substituted metallocenes are metallocenes of the type disclosed or taught, for example, in U.S. Pat. No. 5,145,819 to Winter et. al., U.S. Pat. No. 5,169,818 to Antberg et al., U.S. Pat. No. 5,498,581 to Welch et al., and U.S. Pat. No. 5,541,350 to Murata et al., the complete disclosures of which are incorporated herein by reference.

For best results, the metallocene component used in forming the compositions of this invention contains only one atom of the Group 4 metal per molecule, i.e., for best results the metallocene used does not contain a polymeric backbone to which are attached a plurality of metallocene moieties. Also preferred are metallocenes which contain only one polymerizable olefinic substituent per molecule. A few such olefinically substituted metallocenes containing only one Group 4 metal atom per molecule include the following:

(cyclopentadienyl)(vinylcyclopentadienyl)zirconium dichloride, bis(vinylcyclopentadienyl)zirconium dichloride, bis(2,3-dimethyl-5-vinylcyclopentadienyl)zirconium dichloride, (cyclopentadienyl)(vinylcyclopentadienyl)zirconium dimethyl, bis(vinylcyclopentadienyl)zirconium dimethyl, bis(2,3-dimethyl-5-vinylcyclopentadienyl)zirconium dimethyl, (cyclopentadienyl)(vinylcyclopentadienyl)hafnium dichloride, bis(vinylcyclopentadienyl)hafnium dichloride, bis(2,3-dimethyl-5-vinylcyclopentadienyl)hafnium dichloride, (cyclopentadienyl)(vinylcyclopentadienyl)hafnium dimethyl, bis(vinylcyclopentadienyl)hafnium dimethyl, bis(2,3-dimethyl-5-vinylcyclopentadienyl)hafnium dimethyl, (divinylsilyl)bis(indenyl)zirconium dichloride (also known as divinylsilanediylbis(indenyl)zirconium dichloride), (divinylsilyl)bis(2-methylindenyl)zirconium dichloride, (divinylsilyl)bis(2-ethylindenyl)zirconium dichloride, (diallylsilyl)bis(indenyl)zirconium dichloride, (diallylsilyl)bis(2-methylindenyl)zirconium dichloride, (diallylsilyl)bis(2-ethylindenyl)zirconium dichloride, (diallylsilyl)bis(indenyl)zirconium dichloride, (methylvinylsilyl)bis(indenyl)zirconium dichloride, (methylallylsilyl)bis(indenyl)zirconium dichloride, (divinylsilyl)bis(2-methylindenyl)zirconium dimethyl, (divinylsilyl)bis(2-ethylindenyl)zirconium dimethyl, (diallylsilyl)bis(2-methylindenyl)zirconium dimethyl, (diallylsilyl)bis(2-ethylindenyl)zirconium dimethyl, (divinylsilyl)bis(2-methylindenyl)zirconium(methyl)(phenyl),
(methylvinylsilyl)bis(indenyl)zirconium dimethyl,
(methylallylsilyl)bis(indenyl)zirconium dimethyl,
(cyclopentadienyl)(vinylcyclopentadienyl)hafnium dichloride,
bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(cyclopentadienyl)(vinylcyclopentadienyl)hafnium dichloride,
bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(divinylsilyl)bis(indenyl)hafnium dichloride (also known as divinylsilanediylbis(indenyl)hafnium dichloride),
(divinylsilyl)bis(2-methylindenyl)hafnium dichloride,
(divinylsilyl)bis(2-ethylindenyl)hafnium dichloride,
(diallylsilyl)bis(indenyl)hafnium dichloride,
(diallylsilyl)bis(2-methylindenyl)hafnium dichloride,
(diallylsilyl)bis(2-ethylindenyl)hafnium dichloride,
(diallylsilyl)bis(indenyl)hafnium dichloride,
(methylvinylsilyl)bis(indenyl)hafnium dichloride,
(methylallylsilyl)bis(indenyl)hafnium dichloride,
(divinylsilyl)bis(2-methylindenyl)hafnium dimethyl,
(divinylsilyl)bis(2-ethylindenyl)hafnium dimethyl,
(diallylsilyl)bis(2-methylindenyl)hafnium dimethyl,
(diallylsilyl)bis(2-ethylindenyl)hafnium dimethyl,
(divinylsilyl)bis(2-methylindenyl)hafnium(methyl)(phenyl),
(methylvinylsilyl)bis(indenyl)hafnium dimethyl,
(methylallylsilyl)bis(indenyl)hafnium dimethyl,
(diallylamino)(methyl)silylbis(cyclopentadienyl)titanium dichloride,
(diallylamino)(phenyl)silylbis(cyclopentadienyl)titanium dichloride,
(diallylamino)(methyl)silylbis(cyclopentadienyl)titanium dimethyl,
(diallylamino)(phenyl)silylbis(cyclopentadienyl)titanium dimethyl,
bis[(diallylamino)]silylbis(cyclopentadienyl)titanium dichloride,
bis[(diallylamino)]silylbis(cyclopentadienyl)titanium dimethyl,
bis[(diallylamino)]silylbis(methylcyclopentadienyl)titanium dichloride,
bis[(diallylamino)]silylbis(methylcyclopentadienyl)titanium dimethyl,
bis[(diallylamino)]silylbis(indenyl)titanium dichloride,
bis[(diallylamino)]silylbis(indenyl)titanium dimethyl,
bis[(diallylamino)]silylbis(2-methylindenyl)titanium dichloride,
bis[(diallylamino)]silylbis(2-methylindenyl)titanium dimethyl,
bis[(diallylamino)]silylbis(pentamethylcyclopentadienyl)titanium dichloride,
bis[(diallylamino)]silylbis(pentamethylcyclopentadienyl)titanium dimethyl,
(diallylamino)(methyl)silylbis(cyclopentadienyl)zirconium dichloride,
(diallylamino)(phenyl)silylbis(cyclopentadienyl)zirconium dichloride,
(diallylamino)(methyl)silylbis(cyclopentadienyl)zirconium dimethyl,
(diallylamino)(phenyl)silylbis(cyclopentadienyl)zirconium dimethyl,
bis[(diallylamino)]silylbis(cyclopentadienyl)zirconium dichloride,
bis[(diallylamino)]silylbis(cyclopentadienyl)zirconium dimethyl,
bis[(diallylamino)]silylbis(methylcyclopentadienyl)zirconium dichloride,
bis[(diallylamino)]silylbis(methylcyclopentadienyl)zirconium dimethyl,
bis[(diallylamino)]silylbis(indenyl)zirconium dichloride,
bis[(diallylamino)]silylbis(indenyl)zirconium dimethyl,
bis[(diallylamino)]silylbis(2-methylindenyl)zirconium dichloride,
bis[(diallylamino)]silylbis(2-methylindenyl)zirconium dimethyl,
bis[(diallylamino)]silylbis(pentamethylcyclopentadienyl)zirconium dichloride,
bis[(diallylamino)]silylbis(pentamethylcyclopentadienyl)zirconium dimethyl,
(diallylamino)(methyl)silylbis(cyclopentadienyl)hafnium dichloride,
(diallylamino)(phenyl)silylbis(cyclopentadienyl)hafnium dichloride,
(diallylamino)(methyl)silylbis(cyclopentadienyl)hafnium dimethyl,
(diallylamino)(phenyl)silylbis(cyclopentadienyl)hafnium dimethyl,
bis[(diallylamino)]silylbis(cyclopentadienyl)hafnium dichloride,
bis[(diallylamino)]silylbis(cyclopentadienyl)hafnium dimethyl,
bis[(diallylamino)]silylbis(methylcyclopentadienyl)hafnium dichloride,
bis[(diallylamino)]silylbis(methylcyclopentadienyl)hafnium dimethyl,
bis[(diallylamino)]silylbis(indenyl)hafnium dichloride,
bis[(diallylamino)]silylbis(indenyl)hafnium dimethyl,
bis[(diallylamino)]silylbis(2-methylindenyl)hafnium dichloride,
bis[(diallylamino)]silylbis(2-methylindenyl)hafnium dimethyl,
bis[(diallylamino)]silylbis(pentamethylcyclopentadienyl)hafnium dichloride,
bis[(diallylamino)]silylbis(pentamethylcyclopentadienyl)hafnium dimethyl,
bis(cyclopentadienyl)zirconium diallyl, bis(methylcyclopentadienyl)zirconium diallyl,
bis(2,3,5-trimethylcyclopentadienyl)zirconium diallyl,
(cyclopentadienyl)(pentamethylcyclopentadienyl) zirconium diallyl,
bis(methylindenyl)zirconium diallyl,
(indenyl)(2-methylindenyl)zirconium diallyl,
bis(cyclopentadienyl)hafnium diallyl,
bis(methylcyclopentadienyl)hafnium diallyl,
bis(2,3,5-trimethylcyclopentadienyl)hafnium diallyl,
(cyclopentadienyl)(pentamethylcyclopentadienyl) hafnium diallyl,
bis(methylindenyl)hafnium diallyl,
(indenyl)(2-methylindenyl)hafnium diallyl.

Preferred metallocenes include such compounds as the following:

5-(cyclopentadienyl)-5-(9-fluorenyl) 1-hexene zirconium dichloride,
bis(9-fluorenyl)(methyl)(vinyl)silane zirconium dichloride,
bis(9-fluorenyl)(methyl)(prop-2-enyl)silane zirconium dichloride,
bis(9-fluorenyl)(methyl)(but-3-enyl)silane zirconium dichloride,
bis(9-fluorenyl)(methyl)(hex-5-enyl)silane zirconium dichloride,
bis(9-fluorenyl)(methyl)(oct-7-enyl)silane zirconium dichloride,
(cyclopentadienyl)(1-allylindenyl)zirconium dichloride,
bis(1-allylindenyl)zirconium dichloride,
(9-(prop-2-enyl)fluorenyl)(cyclopentadienyl)zirconium dichloride,
(9-(prop-2-enyl)fluorenyl)(pentamethylcyclopentadienyl) zirconium dichloride,
bis(9-(prop-2-enyl)fluorenyl)zirconium dichloride,
(9-(cyclopent-2-enyl)fluorenyl)(cyclopentadienyl) zirconium dichloride,
bis(9-(cyclopent-2-enyl)(fluorenyl)zirconium dichloride,
5-(2-methylcyclopentadienyl)-5(9-fluorenyl)-1-hexene zirconium dichloride,
1-(9-fluorenyl)-1-(cyclopentadienyl)-1-(but-3-enyl)-1-(methyl)methane zirconium dichloride,
5-(fluorenyl)-5-(cyclopentadienyl)-1-hexene hafnium dichloride,
(9-fluorenyl)(1-allylindenyl)dimethylsilane zirconium dichloride,
(2,7-di(alpha-methylvinyl)(9-fluorenyl)-1-(cyclopentadienyl)-1,1-dimethylmethane zirconium dichloride,
1-(2,7-di(cyclohex-1-enyl)(9-fluorenyl))-1-(cyclopentadienyl)-1,1-methane zirconium dichloride,
5-(cyclopentadienyl)-5-(9-fluorenyl)-1-hexene titanium dichloride,
5-(methylcyclopentadienyl)-5-(9-fluorenyl)1-hexene titanium dichloride,
bis(9-fluorenyl)(methyl)(vinyl)silane titanium dichloride,
bis(9-fluorenyl)(methyl)(prop-2-enyl)silane titanium dichloride,
bis(9-fluorenyl)(methyl)(but-3-enyl)silane titanium dichloride,
bis(9-fluorenyl)(methyl)(hex-5-enyl)silane titanium dichloride,
bis(9-fluorenyl)(methyl)(oct-7-enyl)silane titanium dichloride,
(cyclopentadienyl)(1-allylindenyl)titanium dichloride,
bis(1-allylindenyl)titanium dichloride,
(9-(prop-2-enyl)fluorenyl)(cyclopentadienyl)hafnium dichloride,
(9-(prop-2-enyl)fluorenyl)(pentamethylcyclopentadienyl) hafnium dichloride,
bis(9-(prop-2-enyl)fluorenyl)hafnium dichloride,
(9-(cyclopent-2-enyl)fluorenyl)(cyclopentadienyl) hafnium dichloride,
bis(9-(cyclopent-2-enyl)(fluorenyl)hafnium dichloride,
5-(2-methylcyclopentadienyl)-5(9-fluorenyl)-1-hexene hafnium dichloride,
5-(fluorenyl)-5-(cyclopentadienyl)-1-octene hafnium dichloride,
(9-fluorenyl)(1-allylindenyl)dimethylsilane hafnium dichloride.

It will be noted that the metallocene ingredients are metallocenes of a Group 4 metal, namely, titanium, zirconium or hafnium preferably having two cyclopentadienyl moiety-containing groups which can be separate moieties or they can be joined or connected together by means of a bridge such as, for example, a divalent hydrocarbyl bridge, a silicon-containing divalent bridge, or a germanium-containing divalent bridge, and in any case the metallocene contains polymerizable olefinic substitution in the molecule. Of the Group 4 metals, metallocenes of zirconium are preferred. Particularly preferred metallocenes are those which contain in the molecule only one atom of zirconium, only one polymerizable olefinic substituent, and two cyclopentadienyl moiety-containing groups. In addition these particularly preferred metallocenes do not contain a polymeric backbone to which are attached a plurality of metallocene moieties—i.e., they are not formed by grafting a metallocene onto a preexisting polymeric backbone. In these particularly preferred metallocenes the two cyclopentadienyl moieties can be unbridged, but more preferably are connected or joined together by a bridging group.

As noted above, two or more of the above metallocenes can be used in forming the catalysts of this invention. Likewise, one or more of the above metallocenes containing at least one polymerizable olefinic substituent can be used in combination with one or more Group 4 metallocenes which are devoid of polymerizable olefinic substitution. These latter metallocenes are, in general, the same kind of compounds as the metallocenes described above except that they do not contain any polymerizable olefinic substitution. Thus for example these metallocenes that are devoid of polymerizable olefinic substitution contain in the molecule (A) at least one, and preferably only one, atom of a Group 4 metal and (B) at least one cyclopentadienyl moiety-containing group, and preferably two cyclopentadienyl moiety-containing groups. When two cyclopentadienyl moiety-containing groups are present they can be unbridged or they can be connected together by a bridging group of the type such as described above.

Suitable transition metal compounds which may be used together with the metallocene include the well known Ziegler-Natta catalyst compounds of Group 4–6 metals. Non-limiting illustrative examples of such transition metals include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_3H_7)_2Br_2$, $VCl_4$, $VOCl_3$, $VO(OC_2H_5)_3$, $ZrCl_4$, $ZrCl_3(OC_2H_5)$, $Zr(OC_2H_5)_4$, $ZrCl(OC_4H_9)_3$, and the like.

Olefins

In general, any polymerizable olefinic hydrocarbon or combination of polymerizable olefinic hydrocarbons can be used in forming the catalyst compositions of this invention. Typically, they are one or more alpha-olefins having up to about 18 carbon atoms, although alpha-olefin monomers having even higher carbon atom contents may be used. A few examples include styrene, 1-pentene, 4-methyl-1-butene, 1-hexene, 4-methyl-1-pentene, 1-octene, 1-decene, 1-octadecene, and vinylcyclohexane. Preferred are vinyl olefins having up to about 8 carbon atoms, and more preferred are the vinyl olefinic hydrocarbons (1-alkenes) having from 2 to 4 carbon atoms, namely ethylene, propylene and 1-butene or combinations of any two or all three of these. Combinations of ethylene or propylene with another vinyl olefinic hydrocarbon such as 1-pentene, 1-hexene or 1-octene are also suitable. Ethylene itself is the most preferred olefin for use in forming the self-supported catalysts of this invention.

Prepolymerization Conditions

In the practice of this invention the particulate catalyst compositions of this invention are not made in the presence of a preformed organic or inorganic solid support. Thus the prepolymerization solution is free of any such support, and the particulate vinylolefin prepolymer-Group 4 metallocene-aluminoxane catalyst compositions of this invention are devoid or free of preformed particulate solids except possibly for trace amounts (e.g., <0.5 wt %) of solid impurities that may be present as adventitious impurities in the materials or reaction equipment used in preparing the catalyst particles.

The hydrocarbon solution in which the prepolymerization is to be performed should contain the aluminoxane and metallocene ingredients (or the reaction product(s) formed in situ therefrom) in proportions such that the atom ratio of aluminum to Group 4 metal in the solution is in the range of about 150:1 to about 1500:1, and preferably in the range of about 175:1 to about 1000:1.

As noted above, the proportion of vinylolefin (most preferably, ethylene) to metallocene reacted in the prepolymerization step is in the range of about 150 to about 1500, and preferably in the range of about 175 to about 1000, moles per mole of Group 4 metallocene used in forming the solution in which the prepolymerization is to be conducted. Surprisingly, if the mole ratio of vinylolefin to Group 4 metallocene used in this process step is significantly above the maximum mole ratio utilized pursuant to this invention, the morphology of the catalyst particles becomes very poor. Thus pursuant to this invention, less rather than more vinylolefin is used in forming the prepolymerized catalyst particles. When using a polymerizable gaseous vinylolefin such as ethylene in the prepolymerization reaction, the amount of the gaseous vinylolefin which is reacted in the prepolymerization is typically measured by use of a suitably-calibrated mass flow meter.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −15° C. to about +110° C., more preferably in the range of about +10° to about +30° C. The amount of prepolymer can be varied but typically would be in the range of from about 1 to about 95 wt % of the resulting prepolymerized solid catalyst system more preferably about 5 to 80 wt %. It is generally desirable to carry out the prepolymerization to at least a point where substantially all of the metallocene is in the solid rather than in the liquid since that maximizes the use of the metallocene.

In a preferred embodiment, the metallocene used has only one Group 4 metal atom per molecule, and the prepolymerization reaction is conducted at a temperature of about 15° C. or below. Use of such low temperatures with hydrocarbon solutions containing desirably high concentrations of the aluminoxane and the metallocene and/or preformed mixture or reaction product formed therefrom (e.g., about 15 wt % or more of the aluminoxane and about 1.5 wt % or more of the metallocene in the hydrocarbon solvent medium) the prepolymerization reaction tends to produce self-supported products having higher productivities as compared to use under the same conditions of higher temperatures, such as room temperature or above.

When carrying out the processes of this invention, products with highest productivities tend to be formed by suitable coordination between reaction temperature and concentration of the aluminoxane and the metallocene in the prepolymerization reaction solvent. For example, when it is desired to conduct the prepolymerization at about 25° C., the reaction solution before prepolymerization should be composed of about 96 to about 99 wt %, preferably about 96.5 to about 98 wt %, and more preferably about 96.8 to about 97.5 wt %, of the hydrocarbon solvent with the balance to 100% being the MAO and metallocene (proportioned as described above), especially when the aluminoxane used is methylaluminoxane (MAO) and the metallocene used is one of the above-listed preferred metallocenes. Operation at 25° C. with a solution containing about 94.1 to about 94.5 wt % of the hydrocarbon solvent has resulted in formation of products having much lower productivities. On the other hand when operating at lower temperatures, the reaction solution before prepolymerization can be more concentrated, if desired. Thus if conducting the prepolymerization at about 15° C., the reaction solution before prepolymerization will typically be composed of about 93 to about 99 wt %, preferably about 93.5 to about 96 wt %, and more preferably about 94 to about 96 wt %, of the hydrocarbon solvent with the balance to 100% being the MAO and metallocene. In other words, in this case the solids content (MAO and metallocene, whether fed individually or as a preformed mixture) is typically in the range of from about 1 to about 7 wt %, preferably about 4 to about 6.5 wt %, and more preferably about 4 to about 6 wt %. Because lower prepolymerization temperatures tend to enable formation of products of this invention from more concentrated prepolymerization solutions, it is desirable to conduct the prepolymerization reactions—at least when using MAO, the above listed-preferred metallocenes (e.g., 1-(9-fluorenyl)-1-(cyclopentadienyl)-1-(but-3-enyl)-1-(methyl)methane zirconium dichloride, etc.) and ethylene—at temperatures below room temperature (i.e., below about 20° C.), and more preferably at temperatures of about 15° C. or below, e.g., in the range of about −15° C. to about 15° C. Even lower temperatures can be used as long as the reaction mixture remains in the liquid state at the temperature selected.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid the resulting solid is preferably washed with a hydrocarbon and then dried using high vacuum to remove substantially all the liquids and other volatile components that might still be associated with the solid.

Typical Embodiments of This Invention

From the standpoint of particle size characteristics, self-supported catalyst compositions of this invention have one or more of the following features wherein all percentages are volume percentages:

1) An average (mean) particle size in the range of about 20 to about 60 microns, desirably in the range of about 22 to about 55 microns.
2) A mean:median particle size ratio in the range of 0.7:1 to about 1.5:1, more desirably in the range of about 0.8:1 to about 1.3:1, and still more desirably in the range of about 0.9:1 to about 1.1:1.
3) A particle size distribution in which 75% of the catalyst has a particle size below 70 microns and 25% of the catalyst has a particle size of 70 microns or above, in which 50% of the catalyst has a particle size below 62 microns and 50% of the catalyst has a particle size of 62 microns or above, in which 25% of the catalyst has a particle size below 45 microns and 75% of the catalyst has a particle size of 45 microns or above, and in which no more than 5%, and desirably no more than about 2%, of the catalyst has a particle size above 400 microns.
4) A particle size distribution as described in 3) above except that no more than about 3% and more desirably no more than about 1% of the catalyst has a particle size above 300 microns.
5) A particle size distribution in which 90% of the catalyst has a particle size below 80 microns and 10% of the catalyst has a particle size of 80 microns or above, in which 75% of the catalyst has a particle size below 70 microns and 25% of the catalyst has a particle size of 70 microns or above, in which 50% of the catalyst has a particle size below 62 microns and 50% of the catalyst has a particle size of 62 microns or above, in which 25% of the catalyst has a particle size below 45 microns and 75% of the catalyst has a particle size of 45 microns or above, and in which 10% of the catalyst has a particle size below 25 microns and 90% of the catalyst has a particle size of 25 microns or above.
6) A particle size distribution as described in 5) in which no more than 5%, and desirably no more than about 2%, of the catalyst has a particle size above 400 microns.
7) A particle size distribution as described in 5) in which no more than about 3%, and more desirably no more than about 1%, of the catalyst has a particle size above 300 microns, and more desirably no more than about 1% of the catalyst has a particle size above about 250 microns.
8) A particle size distribution in which 90% of the catalyst has a particle size below 80 microns and 10% of the catalyst has a particle size of 80 microns or above, in which 75% of the catalyst has a particle size below 70 microns and 25% of the catalyst has a particle size of 70 microns or above, in which 50% of the catalyst has a particle size below 62 microns and 50% of the catalyst has a particle size of 62 microns or above, in which 25% of the catalyst has a particle size below 45 microns and 75% of the catalyst has a particle size of 45 microns or above, and in which 10% of the catalyst has a particle size below 6 microns and 90% of the catalyst has a particle size of 6 microns or above.
9) A particle size distribution as described in 8) in which no more than 5%, and desirably no more than about 2%, of the catalyst has a particle size above 400 microns.
10) A particle size distribution as described in 8) in which no more than about 3%, and more desirably no more than about 1%, of the catalyst has a particle size above 300 microns, and more desirably no more than about 1% of the catalyst has a particle size above about 250 microns.
11) The combination of 1) above and 2) above.
12) Each one of the eight (8) individual combinations composed of 1) above and one of each individual member of 3) through 10) above.
13) Each one of the eight (8) individual combinations composed of 2) above and one of each individual member of 3) through 10) above.
14) Each one of the eight (8) individual combinations composed of 1) above, 2) above and one of each individual member of 3) through 10) above.

From the standpoint of productivity determined as described elsewhere herein, self-supported catalyst compositions of this invention have one or more of the following features:

15) A productivity of at least 12,000 grams of polyethylene per gram of catalyst composition.
16) A productivity of at least 15,000 grams of polyethylene per gram of catalyst composition.
17) A productivity of at least 18,000 grams of polyethylene per gram of catalyst composition.
18) A productivity of at least 25,000 grams of polyethylene per gram of catalyst composition.
19) A productivity of at least 30,000 grams of polyethylene per gram of catalyst composition From the combined standpoints of (i) particle size characteristics, and (ii) productivity determined as described elsewhere herein, self-supported catalyst compositions of this invention include embodiments composed of:

20) The combination of 1) above and 15) above.
21) The combination of 1) above and 16) above.
22) The combination of 1) above and 17) above.
23) The combination of 1) above and 18) above.
24) The combination of 1) above and 19) above.
25) The combination of 2) above and 15) above.
26) The combination of 2) above and 16) above.
27) The combination of 2) above and 17) above.
28) The combination of 2) above and 18) above.
29) The combination of 2) above and 19) above.
30) The combination of 11) above and 15) above.
31) The combination of 11) above and 16) above.
32) The combination of 11) above and 17) above.
33) The combination of 11) above and 18) above.
34) The combination of 11) above and 19) above.
35) The combination of 12) above and 15) above.
36) The combination of 12) above and 16) above.
37) The combination of 12) above and 17) above.
38) The combination of 12) above and 18) above.
39) The combination of 12) above and 19) above.
40) The combination of 13) above and 15) above.
41) The combination of 13) above and 16) above.
42) The combination of 13) above and 17) above.
43) The combination of 13) above and 18) above.
44) The combination of 13) above and 19) above.
45) The combination of 14) above and 15) above.
46) The combination of 14) above and 16) above.
47) The combination of 14) above and 17) above.
48) The combination of 14) above and 18) above.
49) The combination of 14) above and 19) above.

From the standpoint of ingredients from which the self-supported catalyst compositions are formed, the following are among preferred embodiments:

50) In each of 1) through 49) above, the metallocene is preferably a zirconocene, more preferably a zirconocene having only one atom of zirconium in the molecule, and still more preferably a zirconocene having two cyclopentadienyl moiety-containing groups in the molecule connected together by a bridging group.

51) In each of 1) through 49) above, the aluminoxane is preferably an alkylaluminoxane, and more metallocene a methylaluminoxane.

52) In each of 1) through 49) above, the vinylolefin used in the prepolymerization is desirably a polymerizable gaseous 1-olefinic hydrocarbon, more desirably ethylene and/or propylene, and most preferably ethylene.

52) A combination of each respective metallocene of 50) with each respective aluminoxane of 51).

53) A combination of each respective metallocene of 50) with each respective vinylolefin of 52).

54) A combination of each respective aluminoxane of 51) with each respective vinylolefin of 52).

55) A combination of each respective metallocene of 50) with each respective aluminoxane of 51) and with each respective vinylolefin of 52).

Polymerization Processes Using Catalysts of This Invention

The heterogeneous catalysts of this invention can be used in polymerizations conducted as slurry processes or as gas phase processes. By "slurry" is meant that the particulate catalyst is used as a slurry or dispersion in a suitable liquid reaction medium which may be composed of one or more ancillary solvents (e.g., liquid aromatic hydrocarbons, etc.) or an excess amount of liquid monomer to be polymerized in bulk. Generally speaking, the polymerizations are conducted at one or more temperatures in the range of about 0 to about 160° C., and under atmospheric, subatmospheric, or superatmospheric conditions. Conventional polymerization adjuvants, such as hydrogen, may be employed if desired. Preferably polymerizations conducted in a liquid reaction medium containing a slurry or dispersion of a catalyst of this invention are conducted at temperatures in the range of about 40 to about 110° C. Typical liquid diluents for such processes include hexane, toluene, and like materials. Typically, when conducting gas phase polymerizations, superatmospheric pressures are used, and the reactions are conducted at temperatures in the range of about 50 to about 120° C. These gas phase polymerizations can be performed in a stirred or fluidized bed of catalyst in a pressure vessel adapted to permit the separation of product particles from unreacted gases. Thermostated ethylene, comonomer, hydrogen and an inert diluent gas such as nitrogen can be introduced or recirculated to maintain the particles at the desired polymerization reaction temperature. An aluminum alkyl such as triethylaluminum may be added as a scavenger of water, oxygen and other impurities. In such cases the aluminum alkyl is preferably employed as a solution in a suitable dry liquid hydrocarbon solvent such as toluene or xylene. Concentrations of such solutions in the range of about $5 \times 10^{-3}$ molar are conveniently used. But solutions of greater or lesser concentrations can be used, if desired. Polymer product can be withdrawn continuously or semi-continuously at a rate that maintains a constant product inventory in the reactor.

Polymers can be produced pursuant to this invention by homopolymerization of polymerizable olefins, typically 1-olefins (also known as α-olefins) such as ethylene, propylene, 1-butene, styrene, or copolymerization of two or more copolymerizable monomers, at least one of which is typically a 1-olefin. The other monomer(s) used in forming such copolymers can be one or more different 1-olefins and/or a diolefin, and/or a polymerizable acetylenic monomer. Normally, the hydrocarbon monomers used, such as 1-olefins, diolefins and/or acetylene monomers, will contain up to about 10 carbon atoms per molecule. Preferred 1-olefin monomers for use in the process include ethylene, propylene, 1-butene, 3-methyl-1-butene, 4-methyl-1-pentene, 1-hexene, and 1-octene. It is particularly preferred to use the particulate catalysts of this invention in the polymerization of ethylene, or propylene, or ethylene and at least one $C_3$–$C_8$ 1-olefin copolymerizable with ethylene. Typical diolefin monomers include 1,6-which can be used to form terpolymers with ethylene and propylene include hexadiene, norbornadiene, and similar copolymerizable diene hydrocarbons. 1-Heptyne and 1-octyne are illustrative of suitable acetylenic monomers which can be used.

Because of the higher activity and productivity of the catalysts of this invention, the amount of the present heterogeneous catalysts used in olefin polymerizations can be somewhat less than is typically used in olefin polymerizations conducted on an equivalent scale. For example, in conducting homopolymerization of ethylene in a 2-liter autoclave with a constant ethylene pressure of 450 psig, excellent results have been achieved using as little as 5 milligrams of catalyst per batch polymerization reaction. Thus in general the polymerizations and copolymerizations conducted pursuant to this invention are carried out using a catalytically effective amount of the heterogeneous catalyst, which amount may be varied depending upon such factors such as the type of polymerization being conducted, the polymerization conditions being used, and the type of reaction equipment in which the polymerization is being conducted. In many cases, the amount of the catalyst of this invention used will be such as to provide in the range of about 0.000001 to about 0.01 percent by weight of Group 4 metal based on the weight of the monomer(s) being polymerized.

After polymerization and deactivation of the catalyst in a conventional manner, the product polymer can be recovered from the polymerization reactor by any suitable means. When conducting the process with a slurry or dispersion of the catalyst in a liquid medium the product typically is recovered by a physical separation technique (e.g. decantation, etc.). The recovered polymer is usually washed with one or more suitably volatile solvents to remove residual polymerization solvent or other impurities, and then dried, typically under reduced pressure with or without addition of heat. When conducting the process as a gas phase polymerization, the product after removal from the gas phase reactor is typically freed of residual monomer by means of a nitrogen purge, and often can be used without further catalyst deactivation or catalyst removal.

When preparing polymers pursuant to this invention conditions may be used for preparing unimodal or multimodal polymer types. For example, mixtures of catalysts of this invention formed from two or more different metallocenes having different propagation and termination rate constants for ethylene polymerizations can be used in preparing polymers having broad molecular weight distributions of the multimodal type.

Productivity Determination

To determine productivity of catalyst particles the following polymerization procedure should be used: A two-liter autoclave is used to carry the polymerizations. The reactor is rinsed with 1100 grams of toluene at a temperature of at least 140° C. for at least 10 minutes. The reactor is then purged with low pressure nitrogen for 5 minutes and then evacuated under vacuum for at least one hour at >140° C. The reactor is purged and vented twice with 600 psig nitrogen and twice with one liter (about 80 psig) of isobutane. The isobutane is vented off, but a small isobutane purge on the reactor is maintained. Once the reactor has cooled to below 40° C., about 15 mg of the particulate metallocene/aluminoxane catalyst as a slurry in 2.0 mL of hexane/TEA solution is charged to the reactor against the counterflow of isobutane. The reactor is then filled with 1.0 liter of isobutane. The agitator is set to 1100 rpm and the reactor is heated to 91.5° C. With the reactor temperature at 91.5° C., ethylene is charged in to give a reactor pressure of 450 psig. Ethylene is polymerized for 1.0 hour. After 1.0 hour, the reactor is slowly vented and cooled. Polyethylene (PE) is removed and weighed. Productivity is calculated by using the expression:

grams PE/grams catalyst×hour.

Productivity is thus determined in the above procedure using the catalyst composition in the form of solid particles; the catalyst is not in solution.

It will be understood and appreciated that the productivity as determined by the above procedure is a property or characteristic of the particulate catalyst to be determined when the catalyst is fresh, the term "fresh" being used in the sense that the catalyst has not been previously used in a polymerization reaction. It is, of course, not necessary to test every batch of fresh catalyst for its productivity, provided the materials and conditions used for preparing the catalyst remain the same from batch to batch, and as long as there is no reason to question the productivity of any particular batch of fresh catalyst where the productivity of one or more prior batches had previously been found to be in accordance with this invention. Thus productivity is a property or inherent characteristic of the particulate catalysts of this invention which manifests itself when and if one or more samples of fresh particulate catalyst are tested for productivity.

It will also be understood and appreciated that the specific surface area is another characteristic of the fresh catalyst.

Determination of Specific Surface Area

To determine specific surface area of the particulate catalysts of this invention the well-known BET technique is used. The BET technique (named after the inventors, Braunauer, Emmett, and Teller) consists of (1) removing adsorbed gases from the sample with heat and vacuum, (2) adsorbing a mono-layer of nitrogen on the surface at liquid nitrogen temperature, (3) measuring the amount of adsorbed nitrogen, and (4) calculating the total surface area of the sample from an assumed cross-sectional area of nitrogen molecules. The total surface area is divided by the sample weight to yield the specific surface area. Specific surface area is defined as the exposed surface area of 1 gram of the sample tested. For best results, the Coulter® LS-230 laser diffraction spectrometer, or equivalent instrument, if any, should be used.

The invention is further illustrated by, but is not intended to be limited to, the following examples. To enable comparison of results, the metallocene used in these examples was the same metallocene as used in the examples of U.S. Pat. No. 5,498,581, viz., 1-(9-fluorenyl)-1-(cyclopentadienyl)-1-(but-3-enyl)-1-(methyl)methane zirconium dichloride.

EXAMPLE 1

A metallocene/methylaluminoxane solution was prepared by adding the olefinic substituted zirconocene (0.00166 mole Zr) to 71.2 grams of 30 wt % methylaluminoxane (MAO) in toluene solution (13.2% Al). The mixture was diluted with 129.2 grams of toluene and then stirred at 25° C. for about 0.5 hour. The metallocene/MAO solution was charged to the reactor. The volume of the contents of the reactor was adjusted to 0.42 liter with addition of toluene. The mixture was cooled to 15° C. The reactor was pressure/vented with ethylene to about 20 psig three to four times to remove nitrogen. The ethylene pressure was adjusted to 5 psig. The prepolymerization of the metallocene/MAO was started. A total of about 33 to 34 grams of ethylene was charged into the reactor over 155 minutes at 15° C./5 psig. The reactor was pressure/vented with nitrogen several times to remove ethylene. The mixture was warmed to 20° C. The contents of the flask were transferred to a nitrogen filled bottle. The bottle was then placed into a dry box. The mixture was filtered through a 600 mL coarse sintered glass frit. The catalyst was washed once with about 300 mL of toluene and once with 300 mL of isopentane. The catalyst was transferred to a one liter flask and was dried under vacuum for 12 hours. Yield of solid catalyst was 32 grams. The surface area of the catalyst particles was 3.64 square meters per gram. When ethylene was polymerized using the above procedure for determining productivity, it was found that the productivity of this heterogeneous catalyst was 23,967 g PE/g catalyst.

EXAMPLE 2

Example 1 was repeated in the same manner except that 18 g of ethylene was used in the prepolymerization step instead of 33 to 34 grams, the prepolymerization reaction was conducted for 85 minutes, and 19 grams of the solid catalyst of the invention was isolated.

The surface area of this particulate catalyst was 6.90 square meters per gram. The productivity of this catalyst using the above procedure was 31,000 g PE/g catalyst.

EXAMPLE 3

Example 1 was again repeated with the exception that the amount of ethylene used in the prepolymerization was 46.8 grams, the prepolymerization was performed for 320 minutes, and the amount of isolated solid catalyst of this invention was 47 grams. The surface area of this solid catalyst was 2.57 square meters per gram. The productivity of this catalyst using the above procedure was 18,300 g PE/g catalyst.

EXAMPLE 4

In this Example the aluminoxane was heat treated before use in forming the catalyst of this invention. In particular, the methylaluminoxane used in this example previously had been heated as a 30% solution in toluene for 2 hours at 80° C. In all other respects the procedure was the same as that of Example 1. The surface are of this catalyst of the invention was 4.63 square meters per gram. The productivity of the heterogeneous catalyst of this invention formed in this manner and using the above procedure was 30,278 g PE/g catalyst.

The polyethylene polymers produced in Examples 1–4 above all had satisfactory particle size and morphology.

A group of four catalyst preparation runs was carried out generally as described in the above Examples but in which the toluene solutions formed from methylaluminoxane and 1-(9-fluorenyl)-1-(cyclopentadienyl)-1-(but-3-enyl)-1-(methyl)methane zirconium dichloride were subjected to prepolymerization with ethylene at 25° C. In runs 1–3 such toluene solutions prior to introduction of the ethylene were in a relatively desirable higher range concentration range. In run 4 the toluene solution was much more dilute. Table 1 summarizes the reaction conditions used and the productivities (determined as described above) of the self-supported catalysts formed in each such run.

TABLE 1

| Run | Metallocene, g | 30 wt % MAO solution, g | Toluene, g | Total Solution wt., g | MAO, wt % | Ethylene, Charged, g | Productivity |
|---|---|---|---|---|---|---|---|
| 1 | 0.77 | 68.7 | 316 | 385.5 | 5.3 | 32 | 8462 |
| 2 | 0.76 | 68 | 313 | 381.8 | 5.3 | 32 | 8466 |
| 3 | 0.76 | 72 | 308 | 380.8 | 5.7 | 32 | 7236 |
| 4 | 0.38 | 35.5 | 345 | 380.9 | 3 | 16 | 20,935 |

The data in Table 1 indicate that with the particular catalyst system employed, the solution of the aluminoxane and metallocene should be relatively dilute when operating at 25° C.

Another group of four runs was conducted as above, but in this case the prepolymerization reaction temperature was 15° C., and in all four runs the concentration of the toluene solution of the methylaluminoxane and the 1-(9-fluorenyl)-1-(cyclopentadienyl)-1-(but-3-enyl)-1-(methyl)methane zirconium dichloride before introduction of the ethylene was in a desirable relatively high range. Table 2 summarizes the reaction conditions used and the productivities (determined as described above) of the self-supported catalysts formed in each such run.

TABLE 2

| Run | Metallocene, g | 30 wt % MAO solution, g | Toluene, g | Total Solution wt., g | MAO, wt % | Ethylene, Charged, g | Productivity |
|---|---|---|---|---|---|---|---|
| 5 | 0.76 | 65.6 | 333 | 399.4 | 4.9 | 32 | 28,900 |
| 6 | 0.76 | 65.7 | 333 | 399.5 | 4.9 | 32 | 29,457 |
| 7 | 0.76 | 68.6 | 336 | 405.4 | 4.9 | 32 | 28,967 |
| 8 | 0.77 | 68.8 | 309 | 378.6 | 5.4 | 32 | 22,784 |

From the data in Table 2 it can be seen that when conducting the prepolymerization at 15° C., the solution of the aluminoxane and metallocene prior to prepolymerization need not be as dilute as the solution used at 25° C.; hence the desirability of operating at temperatures below room temperature, at least with components of the type used in these runs.

As noted above, another distinct advantage of this invention is the very desirable morphology of the particulate self-supported catalysts made possible by the practice of this invention. Typically, particulate self-supported catalysts of this invention, especially those made using ethylene in the prepolymerization, have an essentially monomodal, relatively narrow particle size distribution with very little, if any, fines. This very advantageous feature was demonstrated by subjecting products from Runs 4–8 above to particle size analysis using a Coulter® LS-230 laser diffraction spectrometer. Table 3, in which the percentages are volume percentages and particle sizes are in microns, summarize the results of such analyses. The bulk densities of the catalysts are also given in Table 3.

The recommended equipment to be used in conducting the particle size analysis is COULTER LS-230 Particle Size Analyzer. (LS Series) with Small Volume Module Plus and a Fraunhofer PIDS (Polarization Intensity Differential Scattering) detector, and an HP Vectra VE Computer and Coulter application software, or equivalent. Available from Coulter Corporation, Hialeah, Fla.; 20-mL scintillation vials; and a drybox. The chemicals used are anhydrous n-heptane and lecithin in the form a liquid dietary supplement, which is used as a dispersant. The recommended procedure for measuring particle size using the Coulter LS-230 laser diffraction spectrometer, is as follows: The sample is suspended in heptane and added to the reservoir of a recirculating pump, so that a stream of well-dispersed particles passes continuously through a transparent sample cell. A laser beam is then projected through this cell and light scattered by the particles is measured by two optical detector arrays. The smaller particles in the distribution (0.04 to 0.4 microns) are quantified by a polarization intensity differential scattering (PIDS) method. In the PIDS technique, both vertically and horizontally polarized scattered light is measured. In addition, three different wavelengths of incident light is used in the PIDS technique. The larger particles in the distribution (0.4–2000 microns) are characterized by the angular dependence of unpolarized scattered light. The signals from both detector arrays are combined and processed by a micro-computer which calculates the particle size distribution of the sample. The computer "run info" for the procedure is set for a run length of 60 seconds and a wait length of 0 seconds with the number of runs being 4, with these 4 runs being averaged for the final result.

The Coulter LS-230 instrument uses an optical model to calculate particle size of a material based on the measured scattered light. This model must be constructed and saved by the instrument's microcomputer before samples of the material can be run. Enter the refractive index of the solvent, heptane, R.I.=1.39, and of the sample material, as measured by a microscope technique using oil immersion. Calculations of particle size results are automatically performed by the instrument's microcomputer. The Coulter LS 230 reports volume % of particles.

TABLE 3

Particle Size Distribution and Bulk Densities of Particulate Self-Supported Catalysts of the Invention

| Product Run Number | Run 4 | Run 5 | Run 6 | Run 7 | Run 8 |
|---|---|---|---|---|---|
| Average size | 34.51 | 24.78 | 29.43 | 32.78 | 31.57 |
| 90% less than | 53.66 | 45.18 | 54.86 | 53.24 | 49.70 |
| 75% less than | 44.95 | 34.16 | 35.89 | 42.91 | 38.95 |
| 50% less than | 35.75 | 24.01 | 22.52 | 33.12 | 30.36 |
| 25% less than | 26.53 | 15.15 | 12.87 | 23.99 | 22.66 |
| 10% less than | 7.451 | 1.014 | 0.867 | 1.999 | 5.241 |
| Particle size range | 0.040 to 83.90 | <0.040 to 92.09 | <0.040 to 309.6 | <0.040 to 92.09 | 0.040 to 213.2 |
| Bulk Density | 0.32 g/cc | 0.36 g/cc | 0.34 g/cc | 0.31 g/cc | 0.31 g/cc |

Another advantageous feature of this invention is that use of the self-supported catalysts of this invention in polymerization reactions makes possible the formation of polymers having desirable particle size distributions. For example, in the homopolymerization of ethylene using catalysts of the type used in Runs 4–8 above, it is possible to form polyethylene product containing, if any, less than 10%, usually less than 5%, and often less than 2%, of fines (i.e., particles with particle sizes of 150 microns and below). To illustrate, Table 4 summarizes the particle size distribution from homopolymerization of ethylene in a 4-liter autoclave at 90° C. with a total pressure of 450 psi of isobutane (2 liters) and ethylene in one hour using 10 mg of the catalyst of Run 7 above and a constant feed of ethylene.

TABLE 4

Particle Size Distribution of Polyethylene Produced Using a Self-Supported Catalyst of the Invention

| | |
|---|---|
| Average size | 1010 microns |
| 90% less than | 1574 microns |
| 75% less than | 1244 microns |
| 50% less than | 947.8 microns |
| 25% less than | 728.7 microns |
| 10% less than | 576.2 microns |
| Particle size range | 57.77 to >2000 microns |

From the foregoing it can be seen that this invention comprises a wide variety of embodiments. Some of these embodiments are as follows:

AA) A self-supported vinylolefin-prepolymerized Group 4 metallocene-aluminoxane particulate catalyst composition devoid of a preformed support and having a productivity, when fresh and if tested in slurry form for productivity with ethylene in a 2-liter autoclave that has been precharged with about one liter of isobutane and that is charged with ethylene to a total pressure of 450 psig at 91.5° C., of at least 18,000 grams of polyethylene per gram of catalyst in one hour, the metallocene having prior to prepolymerization at least one polymerizable olefinic substituent in the molecule.

AB) A catalyst composition according to AA) further characterized in that it has a specific surface area of no more than about 20 $m^2/g$.

AC) A catalyst composition according to AA) further characterized in that it has a specific surface area of less than about 10 $m^2/g$.

AD) A catalyst composition according to AA) wherein the Group 4 metallocene used in forming said composition is a zirconium metallocene.

AE) A catalyst composition according to AA) wherein the aluminoxane used in forming said composition is a methylaluminoxane.

AF) A catalyst composition according to AA) wherein the Group 4 metallocene used in forming said composition is a zirconium metallocene, and wherein the aluminoxane used in forming said composition is a methylaluminoxane.

AG) A catalyst composition according to AF) wherein said composition has a specific surface area of no more than about 20 $m^2/g$.

AH) A catalyst composition according to AF) wherein said composition has a specific surface area of less than about 10 $m^2/g$.

AI) A catalyst composition according to AA) wherein said composition has a productivity, when fresh and if tested for productivity in accordance with AA), of at least 25,000 grams of polyethylene per gram of catalyst in one hour.

AJ) A catalyst composition according to AI) further characterized in that it has a specific surface area of less than about 10 $m^2/g$.

AK) A catalyst composition according to AI) wherein the Group 4 metallocene used in forming said composition is a zirconium metallocene.

AL) A catalyst composition according to AI) wherein the aluminoxane used in forming said composition is a methylaluminoxane.

AM) A catalyst composition according to AI) wherein the Group 4 metallocene used in forming said composition is a zirconium metallocene, wherein the aluminoxane used in forming said composition is a methylaluminoxane, and wherein said composition has a specific surface area of less than about 10 $m^2/g$.

AN) A catalyst composition according to AA) wherein said composition has a productivity, when fresh and if tested for productivity in accordance with AA), of at least 30,000 grams of polyethylene per gram of catalyst in one hour.

AO) A catalyst composition according to AN) further characterized in that it has a specific surface area of less than about 10 $m^2/g$.

AP) A catalyst composition according to AN) wherein the Group 4 metallocene used in forming said composition is a zirconium metallocene.

AQ) A catalyst composition according to AN) wherein the aluminoxane used in forming said composition is a methylaluminoxane.

AR) A catalyst composition according to AN) wherein the Group 4 metallocene used in forming said composition is a zirconium metallocene, wherein the aluminoxane used in forming said composition is a methylaluminoxane, and wherein said composition has a specific surface area of less than about 10 $m^2/g$.

AS) A catalyst composition according to AA) wherein the aluminoxane used in forming said composition is an aluminoxane that has previously been heated at a temperature of at least about 40° C.

AT) A catalyst composition according to AS) further characterized in that it has a specific surface area of less than about 10 m$^2$/g.

AU) A catalyst composition according to AS) wherein the Group 4 metallocene used in forming said composition is a zirconium metallocene.

AV) A catalyst composition according to AS) wherein the metallocene used in forming said composition is 1-(9-fluorenyl)-1-(cyclopentadienyl)-1-(but-3-enyl)-1-(methyl)methane zirconium dichloride, and wherein the aluminoxane used in forming said composition is a methylaluminoxane.

AW) A catalyst composition according to AS) wherein the Group 4 metallocene used in forming said composition is a zirconium metallocene, wherein the aluminoxane used in forming said composition is a methylaluminoxane, and wherein said composition has a specific surface area of less than about 10 m$^2$/g.

AX) A catalyst composition according to AA) wherein the aluminoxane used in forming said composition is a methylaluminoxane that has previously been heated at a temperature of at least about 40° C.

AY) A catalyst composition according to AX) further characterized in that it has a specific surface area of less than about 10 m$^2$/g.

AZ) A catalyst composition according to AX) wherein the Group 4 metallocene used in forming said composition is a zirconium metallocene.

BA) A catalyst composition according to AA) wherein the Group 4 metallocene used in forming said composition is a hafnium metallocene.

BB) A self-supported ethylene-prepolymerized Group 4 metallocene-aluminoxane particulate catalyst composition devoid of a preformed support and having a productivity, when fresh and if tested in slurry form for productivity with ethylene in a 2-liter autoclave that has been precharged with about one liter of isobutane and that is charged with ethylene to a total pressure of 450 psig at 91.5° C., of at least 18,000 grams of polyethylene per gram of catalyst in one hour, the metallocene having prior to prepolymerization at least one polymerizable olefinic substituent in the molecule.

BC) A catalyst composition according to BB) further characterized in that it has a specific surface area of no more than about 20 m$^2$/g.

BD) A catalyst composition according to BB) further characterized in that it has a specific surface area of less than about 10 m$^2$/g.

BE) A catalyst composition according to BB) wherein the Group 4 metallocene used in forming said composition is a zirconium metallocene.

BF) A catalyst composition according to BB) wherein the aluminoxane used in forming said composition is a methylaluminoxane.

BG) A catalyst composition according to BB) wherein the Group 4 metallocene used in forming said composition is a zirconium metallocene, and wherein the aluminoxane used in forming said composition is a methylaluminoxane.

BH) A catalyst composition according to BG) wherein said composition has a specific surface area of no more than about 20 m$^2$/g.

BI) A catalyst composition according to BG) wherein said composition has a specific surface area of less than about 10 m$^2$/g.

BJ) A catalyst composition according to BB) wherein said composition has a productivity, when fresh and if tested for productivity in accordance with BB), of at least 25,000 grams of polyethylene per gram of catalyst in one hour.

BK) A catalyst composition according to BJ) further characterized in that it has a specific surface area of less than about 10 m$^2$/g.

BL) A catalyst composition according to BJ) wherein the Group 4 metallocene used in forming said composition is a zirconium metallocene.

BM) A catalyst composition according to BJ) wherein the aluminoxane used in forming said composition is a methylaluminoxane.

BN) A catalyst composition according to BJ) wherein the Group 4 metallocene used in forming said composition is a zirconium metallocene, wherein the aluminoxane used in forming said composition is a methylaluminoxane, and wherein said composition has a specific surface area of less than about 10 m$^2$/g.

BO) A catalyst composition according to BB) wherein said composition has a productivity, when fresh and if tested for productivity in accordance with BB), of at least 30,000 grams of polyethylene per gram of catalyst in one hour.

BP) A catalyst composition according to BO) further characterized in that it has a specific surface area of less than about 10 m$^2$/g.

BQ) A catalyst composition according to BO) wherein the Group 4 metallocene used in forming said composition is a zirconium metallocene.

BR) A catalyst composition according to BO) wherein the aluminoxane used in forming said composition is a methylaluminoxane.

BS) A catalyst composition according to BO) wherein the Group 4 metallocene used in forming said composition is a zirconium metallocene, wherein the aluminoxane used in forming said composition is a methylaluminoxane, and wherein said composition has a specific surface area of less than about 10 m$^2$/g.

BT) A catalyst composition according to BB) wherein the aluminoxane used in forming said composition is an aluminoxane that has previously been heated at a temperature of at least about 40° C.

BU) A catalyst composition according to BT) further characterized in that it has a specific surface area of less than about 10 m$^2$/g.

BV) A catalyst composition according to BT) wherein the Group 4 metallocene used in forming said composition is a zirconium metallocene.

BW) A catalyst composition according to BT) wherein the metallocene used in forming said composition is 1-(9-fluorenyl)-1-(cyclopentadienyl)-1-(but-3-enyl)-1-(methyl)methane zirconium dichloride, and wherein the aluminoxane used in forming said composition is a methylaluminoxane.

BX) A catalyst composition according to BT) wherein the Group 4 metallocene used in forming said composition is a zirconium metallocene, wherein the aluminoxane used in forming said composition is a methylaluminoxane, and wherein said composition has a specific surface area of less than about 10 m$^2$/g.

BY) A catalyst composition according to BB) wherein the aluminoxane used in forming said composition is a methylaluminoxane that has previously been heated at a temperature of at least 40° C.

BZ) A catalyst composition according to BY) further characterized in that it has a specific surface area of less than about 10 m$^2$/g.

CA) A catalyst composition according to BY) wherein the Group 4 metallocene used in forming said composition is a zirconium metallocene.

CB) A catalyst composition according to BB) wherein the Group 4 metallocene used in forming said composition is a hafnium metallocene.

CC) A process which comprises: a) mixing together in an inert organic solvent medium at least one Group 4 metallocene having at least one polymerizable olefinic substituent in the molecule, and at least one aluminoxane, to form a catalytic solution; and b) reacting under polymerization conditions a controlled amount of at least one vinylolefin monomer with catalytic solution formed in a) such that self-supported solid catalyst particles devoid of any preformed support form having a specific surface area of no more than about 20 square meters per gram ($m^2/g$).

CD) A process according to CC) wherein the mole ratio of vinylolefin to Group 4 metallocene reacted in b) is in the range of about 150:1 to about 1500:1.

CE) A process according to CC) wherein the mole ratio of vinylolefin to Group 4 metallocene reacted in b) is in the range of about 175:1 to about 1000:1.

CF) A process according to CC) wherein the atom ratio of aluminum to Group 4 metal in said solution is in the range of about 50:1 to about 1500:1, and preferably in the range of about 150:1 to about 1500:1.

CG) A process according to CC) wherein the atom ratio of aluminum to Group 4 metal in said solution is in the range of about 175:1 to about 1000:1.

CH) A process according to CC) wherein the mole ratio of vinylolefin to Group 4 metallocene reacted in b) is in the range of about 150:1 to about 1500:1; and wherein the atom ratio of aluminum to Group 4 metal in said catalytic solution of a) is in the range of about 150:1 to about 1500:1.

CI) A process according to CC) wherein the mole ratio of vinylolefin to Group 4 metallocene reacted in b) is in the range of about 175:1 to about 1000:1; and wherein the atom ratio of aluminum to Group 4 metal in said catalytic solution of a) is in the range of about 175:1 to about 1000:1.

CJ) A process according to CC) wherein the Group 4 metallocene is a zirconium metallocene and wherein the aluminoxane is entirely or predominately a methylaluminoxane.

CK) A process according to CC) wherein the aluminoxane comprises an aluminoxane that has previously been heated at a temperature of at least about 40° C.

CL) A process according to CC) wherein the Group 4 metallocene is a zirconium metallocene having a pair of cyclopentadienyl-moiety-containing groups connected together by a bridging group; and wherein the aluminoxane is entirely or predominately a methylaluminoxane.

CM) A process according to CC) wherein the Group 4 metallocene is a zirconium metallocene having a pair of cyclopentadienyl-moiety-containing groups connected together by a bridging group; and wherein the aluminoxane comprises a methylaluminoxane that has previously been heated at a temperature of at least about 40° C.

CN) A process which comprises: a) mixing together in an inert hydrocarbon solvent medium at least one Group 4 metallocene having at least one polymerizable olefinic substituent in the molecule, and at least one aluminoxane, to form a catalytic solution; and b) reacting under polymerization conditions a controlled amount of ethylene with catalytic solution formed in a) such that self-supported solid catalyst particles devoid of any preformed support form having a specific surface area of no more than about 20 square meters per gram ($m^2/g$).

CO) A process according to CN) wherein the mole ratio of ethylene to Group 4 metallocene reacted in b) is in the range of about 150:1 to about 1500:1.

CP) A process according to CN) wherein the mole ratio of ethylene to Group 4 metallocene reacted in b) is in the range of about 175:1 to about 1000:1.

CQ) A process according to CN) wherein the atom ratio of aluminum to Group 4 metal in said solution is in the range of about 50:1 to about 1500:1, and preferably in the range of about 150:1 to about 1500:1.

CR) A process according to CN) wherein the atom ratio of aluminum to Group 4 metal in said solution is in the range of about 175:1 to about 1000:1.

CS) A process according to CN) wherein the mole ratio of ethylene to Group 4 metallocene reacted in b) is in the range of about 150:1 to about 1500:1; and wherein the atom ratio of aluminum to Group 4 metal in said catalytic solution of a) is in the range of about 150:1 to about 1500:1.

CT) A process according to CN) wherein the mole ratio of ethylene to Group 4 metallocene reacted in b) is in the range of about 175:1 to about 1000:1; and wherein the atom ratio of aluminum to Group 4 metal in said catalytic solution of a) is in the range of about 175:1 to about 1000:1.

CU) A process according to CN) wherein the Group 4 metallocene is a zirconium metallocene.

CV) A process according to CN) wherein the aluminoxane is entirely or predominately a methylaluminoxane.

CW) A process according to CN) wherein the aluminoxane comprises a methylaluminoxane that has previously been heated at a temperature of at least about 40° C.

CX) A process according to CN) wherein the Group 4 metallocene is a zirconium metallocene having a pair of cyclopentadienyl-moiety-containing groups connected together by a bridging group; and wherein the aluminoxane is entirely or predominately a methylaluminoxane.

CY) A process according to CN) wherein the Group 4 metallocene is a zirconium metallocene having a pair of cyclopentadienyl-moiety-containing groups connected together by a bridging group; and wherein the aluminoxane comprises a methylaluminoxane that has previously been heated at a temperature of at least about 40° C.

CZ) A process according to CN) wherein the mole ratio of ethylene to Group 4 metallocene reacted in b) is in the range of about 150:1 to about 1500:1; wherein the atom ratio of aluminum to Group 4 metal in said catalytic solution of a) is in the range of about 150:1 to about 1500:1; and wherein the Group 4 metallocene is a zirconium metallocene.

DA) A process according to CZ) wherein the zirconium metallocene has a pair of cyclopentadienyl-moiety-containing groups connected together by a bridging group, and wherein the aluminoxane is entirely or predominately a methylaluminoxane.

DB) A process according to CN) wherein the mole ratio of ethylene to Group 4 metallocene reacted in b) is in the range of about 175:1 to about 1000:1; wherein the atom ratio of aluminum to Group 4 metal in said catalytic solution of a) is in the range of about 175:1 to about 1000:1; wherein the Group 4 metallocene is a zirconium metallocene that has a pair of cyclopentadienyl-moiety-containing groups connected together by a bridging group; and wherein the aluminoxane is entirely or predominately a methylaluminoxane.

DC) A process according to DB) wherein the methylaluminoxane has previously been heated at a temperature of at least about 40° C.

DD) A process according to CN) wherein the mole ratio of ethylene to Group 4 metallocene reacted in b) is in the range of about 150:1 to about 1500:1; wherein the atom ratio of aluminum to Group 4 metal in said catalytic solution of a) is in the range of about 150:1 to about 1500:1; and wherein the Group 4 metallocene is a hafnium metallocene.

DE) A process according to DD) wherein the hafnium metallocene has a pair of cyclopentadienyl-moiety-containing groups connected together by a bridging group, and wherein the aluminoxane is entirely or predominately a methylaluminoxane.

DF) A process according to CN) wherein the mole ratio of ethylene to Group 4 metallocene reacted in b) is in the range of about 175:1 to about 1000:1; wherein the atom ratio of aluminum to Group 4 metal in said catalytic solution of a) is in the range of about 175:1 to about 1000:1; wherein the Group 4 metallocene is a hafnium metallocene that has a pair of cyclopentadienyl-moiety-containing groups connected together by a bridging group; and wherein the aluminoxane is entirely or predominately a methylaluminoxane.

DG) A process according to DF) wherein the methylaluminoxane has previously been heated at a temperature of at least about 40° C.

DH) A process which comprises: a) mixing together in an inert hydrocarbon solvent medium at least one Group 4 metallocene having at least one polymerizable olefinic substituent in the molecule, and at least one aluminoxane, to form a catalytic solution wherein the atom ratio of aluminum to Group 4 metal in said solution is in the range of about 50:1 to about 1500:1 (preferably in the range of about 150:1 to about 1500:1); and b) contacting a controlled amount of ethylene with catalytic solution from a) under polymerization conditions such that particulate solids are formed by a prepolymerization reaction in which the mole ratio of ethylene to Group 4 metallocene that undergo such reaction is in the range of about 150:1 to about 1500:1, and such that said solids have a productivity, when fresh and if tested in slurry form for productivity with ethylene in a 2-liter autoclave that has been precharged with about one liter of isobutane and that is charged with ethylene to a total pressure of 450 psig at 91.5° C., of at least 18,000 grams of polyethylene per gram of catalyst in one hour.

DI) A process according to DH) wherein said atom ratio in a) is in the range of about 175:1 to about 1000:1, and wherein said mole ratio in b) is in the range of about 175:1 to about 1000:1.

DJ) A process according to DH) wherein the Group 4 metallocene is a zirconium or hafnium metallocene, and wherein the aluminoxane is entirely or predominately a methylaluminoxane.

DK) A process according to DJ) wherein the methylaluminoxane has previously been heated at a temperature of at least about 40° C.

DL) A particulate catalyst composition comprising the product formed by prepolymerizing a vinylolefin with (i) at least one Group 4 metallocene and at least one aluminoxane, and/or (ii) a reaction product of said metallocene and said aluminoxane, in a hydrocarbon solution devoid of any preformed support, said catalyst being characterized by having, when fresh and if tested in slurry form for productivity with ethylene in a 2-liter autoclave that has been precharged with about one liter of isobutane and that is charged with ethylene to a total pressure of 450 psig at 91.5° C., a productivity of at least 18,000 grams of polyethylene per gram of catalyst in one hour, the metallocene having prior to prepolymerization at least one polymerizable olefinic substituent in the molecule.

DM) A particulate catalyst composition comprising the product formed by prepolymerizing ethylene with (i) at least one Group 4 metallocene and at least one aluminoxane, and/or (ii) a reaction product of said metallocene and said aluminoxane, said prepolymerization being conducted in a hydrocarbon solution devoid of any preformed support, said catalyst being characterized by having, when fresh and if tested in slurry form for productivity with ethylene in a 2-liter autoclave that has been precharged with about one liter of isobutane and that is charged with ethylene to a total pressure of 450 psig at 91.5° C., a productivity of at least 18,000 grams of polyethylene per gram of catalyst in one hour, the metallocene having prior to prepolymerization at least one polymerizable olefinic substituent in the molecule.

DN) A composition according to DM) wherein the Group 4 metallocene used in forming said hydrocarbon solution is a zirconium metallocene having a pair of cyclopentadienyl-moiety-containing groups connected together by a bridging group; and wherein the aluminoxane is entirely or predominately a methylaluminoxane, which optionally previously has been heated at one or more temperatures in the range of about 70 to about 90° C.

DO) A catalyst composition according to AA) wherein the Group 4 metallocene used in forming said composition has a pair of cyclopentadienyl-moiety-containing groups connected together by a bridging group.

DP) A catalyst composition according to DO) wherein said metallocene is a zirconium metallocene.

DQ) A catalyst composition according to DP) wherein the aluminoxane used in forming said composition is a methylaluminoxane.

DR) A catalyst composition according to DP) wherein said zirconium metallocene is 1-(9-fluorenyl)-1-(cyclopentadienyl)-1-but-3-enyl)-1-(methyl)methane zirconium dichloride.

DS) A catalyst composition according to DR) wherein the aluminoxane used in forming said composition is a methylaluminoxane.

DT) A catalyst composition according to AI) wherein the Group 4 metallocene used in forming said composition has a pair of cyclopentadienyl-moiety-containing groups connected together by a bridging group.

DU) A catalyst composition according to DT) wherein said metallocene is a zirconium metallocene.

DV) A catalyst composition according to DU) wherein the aluminoxane used in forming said composition is a methylaluminoxane.

DW) A catalyst composition according to DU) wherein said zirconium metallocene is 1-(9-fluorenyl)-1-(cyclopentadienyl)-1-but-3-enyl)-1-(methyl)methane zirconium dichloride.

DX) A catalyst composition according to DW) wherein the aluminoxane used in forming said composition is a methylaluminoxane.

DY) A catalyst composition according to BB) wherein the Group 4 metallocene used in forming said composition has a pair of cyclopentadienyl-moiety-containing groups connected together by a bridging group.

DZ) A catalyst composition according to DY) wherein said metallocene is a zirconium metallocene.

EA) A catalyst composition according to DZ) wherein the aluminoxane used in forming said composition is a methylaluminoxane.

EB) A catalyst composition according to DZ) wherein said zirconium metallocene is 1-(9-fluorenyl)-1-(cyclopentadienyl)-1-but-3-enyl)-1-(methyl)methane zirconium dichloride.

EC) A catalyst composition according to EB) wherein the aluminoxane used in forming said composition is a methylaluminoxane.

ED) A catalyst composition according to BJ) wherein the Group 4 metallocene used in forming said composition has a pair of cyclopentadienyl-moiety-containing groups connected together by a bridging group.

EE) A catalyst composition according to ED) wherein said metallocene is a zirconium metallocene.

EF) A catalyst composition according to EE) wherein the aluminoxane used in forming said composition is a methylaluminoxane.

EG) A catalyst composition according to EE) wherein said zirconium metallocene is 1-(9-fluorenyl)-1-(cyclopentadienyl)-1-but-3-enyl)-1-(methyl)methane zirconium dichloride.

EH) A catalyst composition according to EG) wherein the aluminoxane used in forming said composition is a methylaluminoxane.

It is to be understood that the ingredients referred to by chemical name or formula anywhere in the specification or claims hereof, whether referred to in the singular or plural, are identified as they exist prior to coming into contact with another substance referred to by chemical name or chemical type (e.g., another reactant, a solvent, a diluent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and other materials are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises", "is", etc.), the reference is to the substance or ingredient as it existed at the time just before it was first contacted, blended or mixed with one or more other substances or ingredients in accordance with the present disclosure. The fact that the substance or ingredient may have lost its original identity through a chemical reaction or transformation or complex formation or assumption of some other chemical form during the course of such contacting, blending or mixing operations, is thus wholly immaterial for an accurate understanding and appreciation of this disclosure and the claims thereof. Nor does reference to an ingredient by chemical name or formula exclude the possibility that during the desired reaction itself an ingredient becomes transformed to one or more transitory intermediates that actually enter into or otherwise participate in the reaction. In short, no representation is made or is to be inferred that the named ingredients must participate in the reaction while in their original chemical composition, structure or form.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A self-supported vinylolefin-prepolymerized Group 4 metallocene-aluminoxane particulate catalyst composition devoid of a preformed support and having (i) a mean (average) particle size in the range of about 20 to about 60 microns, (ii) a mean:median particle size ratio in the range of about 0.7:1 to about 1.5:1, and (iii) a productivity, when fresh and if tested in slurry form for productivity with ethylene in a 2-liter autoclave that has been precharged with about one liter of isobutane and that is charged with ethylene to a total pressure of 450 psig at 91.5° C., of at least 12,000 grams of polyethylene per gram of catalyst in one hour, the metallocene having, prior to use in forming said catalyst composition, at least one polymerizable olefinic substituent in the molecule.

2. A catalyst composition according to claim 1 wherein said mean (average) particle size is in the range of about 22 to about 55 microns, and said mean:median particle size ratio in the range of about 0.8:1 to about 1.3:1.

3. A catalyst composition according to claim 1 wherein said productivity of said composition, when fresh and if tested for productivity, is at least 18,000 grams of polyethylene per gram of catalyst in one hour.

4. A catalyst composition according to claim 3 wherein the Group 4 metallocene that is used in forming said composition is a zirconium metallocene having only one atom of zirconium in the molecule, and wherein the aluminoxane that is used in forming said composition, is a methylaluminoxane.

5. A catalyst composition according to claim 3 wherein the Group 4 metallocene that is used in forming said composition, is a zirconium metallocene having only one atom of zirconium in the molecule, and wherein the aluminoxane that is used in forming said composition is a methylaluminoxane that has previously been heated at a temperature of at least about 40° C.

6. A catalyst composition according to claim 4 or 5 wherein the metallocene that is used in forming said composition has two cyclopentadienyl moiety-containing groups in the molecule that are connected together by a bridging group.

7. A self-supported ethylene-prepolymerized Group 4 metallocene-aluminoxane particulate catalyst composition devoid of a preformed support and having (i) a particle size distribution in which 75% of the catalyst composition has a particle size below 70 microns and 25% of the catalyst composition has a particle size of 70 microns or above, in which 50% of the catalyst composition has a particle size below about 62 microns and 50% of the catalyst composition has a particle size of 62 microns or above, in which 25% of the catalyst composition has a particle size below 45 microns and 75% of the catalyst composition has a particle size of 45 microns or above, and in which no more than 5% of the catalyst composition has a particle size above 400 microns, the foregoing percentages being volume percentages, and (ii) a productivity, when fresh and if tested in slurry form for productivity with ethylene in a 2-liter autoclave that has been precharged with about one liter of isobutane and that is charged with ethylene to a total pressure of 450 psig at 91.5° C., of at least 12,000 grams of polyethylene per gram of catalyst in one hour, the metallocene having, prior to use in forming said catalyst composition, at least one polymerizable olefinic substituent in the molecule.

8. A catalyst composition according to claim 7 wherein said composition has a mean (average) particle size in the range of about 20 to about 60 microns, and wherein said productivity of said composition, when fresh and if tested for productivity, is at least 18,000 grams of polyethylene per gram of catalyst in one hour.

9. A catalyst composition according to claim 7 wherein the Group 4 metallocene that is used in forming said composition is a zirconium metallocene having only one atom of zirconium in the molecule, and wherein the aluminoxane that is used in forming said composition is a methylaluminoxane.

10. A catalyst composition according to claim 7 wherein the Group 4 metallocene that is used in forming said composition is a zirconium metallocene having only one atom of zirconium in the molecule, wherein the aluminoxane that is used in forming said composition is a methylaluminoxane that has previously been heated at a temperature of at least about 40° C.

11. A catalyst composition according to any of claims 7–10 wherein the metallocene that is used in forming said composition has two cyclopentadienyl moiety-containing groups in the molecule that are connected together by a bridging group.

12. A process which comprises contacting in an inert organic solvent medium and under polymerization conditions, a controlled amount of at least one vinylolefin monomer with (a) at least one Group 4 metallocene that has at least one polymerizable olefinic substituent in the molecule, and (b) at least one aluminoxane, and/or (c) at least one reaction product formed from (a) and (b), such that prepolymerization occurs and there is formed a self-supported particulate catalyst composition devoid of any preformed support and having (i) a mean (average) particle size in the range of about 20 to about 60 microns, (ii) a mean:median particle size ratio in the range of about 0.7:1 to about 1.5:1, and (iii) a productivity, when fresh and if tested in slurry form for productivity with ethylene in a 2-liter autoclave that has been precharged with about one liter of isobutane and that is charged with ethylene to a total pressure of 450 psig at 91.5° C., of at least 12,000 grams of polyethylene per of catalyst in one hour.

13. A process according to claim 12 wherein the mole ratio of vinylolefin to Group 4 metallocene prepolymerized in forming said catalyst particles is in the range of about 150:1 to about 1500:1.

14. A process according to claim 12 wherein the atom ratio of aluminum to Group 4 metal is in the range of about 150:1 to about 1500:1.

15. A process according to any of claims 12–14 wherein the vinylolefin used in conducting the prepolymerization is ethylene, and wherein said productivity of said catalyst particles, when fresh and if tested for productivity, is at least 18,000 grams of polyethylene per gram of catalyst in one hour.

16. A process which comprises contacting in an inert organic solvent medium and under polymerization conditions, a controlled amount of ethylene with (a) at least one zirconium metallocene that has at least one polymerizable olefinic substituent in the molecule, and (b) at least one aluminoxane, and/or (c) at least one reaction product formed from (a) and (b), such that prepolymerization occurs and there is formed a self-supported particulate catalyst composition devoid of any preformed support, and having (i) a mean (average) particle size in the range of about 20 to about 60 microns, (ii) a mean:median particle size ratio in the range of about 0.7:1 to about 1.5:1, (iii) a particle size distribution in which 75% of the catalyst composition has a particle size below 70 microns and 25% of the catalyst composition has a particle size of 70 microns or above, in which 50% of the catalyst composition has a particle size below about 62 microns and 50% of the catalyst composition has a particle size of 62 microns or above, in which 25% of the catalyst composition has a particle size below 45 microns and 75% of the catalyst composition has a particle size of 45 microns or above, and in which no more than 5% of the catalyst composition has a particle size above 400 microns, the foregoing percentages being volume percentages, and (iv) a productivity, when fresh and if tested in slurry form for productivity with ethylene in a 2-liter autoclave that has been precharged with about one liter of isobutane and that is charged with ethylene to a total pressure of 450 psig at 91.5° C., of at least 12,000 grams of polyethylene per gram of catalyst in one hour.

17. A process according to claim 16 wherein said composition has a mean (average) particle size in the range of about 22 to about 55 microns, and wherein said productivity of said catalyst composition, when fresh and if tested for productivity, is at least 18,000 grams of polyethylene per gram of catalyst in one hour.

18. A process according to claim 16 wherein the zirconium metallocene that is used in the process has only one atom of zirconium in the molecule, and wherein the aluminoxane that is used in conducting the process is a methylaluminoxane.

19. A process according to any of claims 16–18 wherein the metallocene that is used in the process has two cyclopentadienyl moiety-containing groups in the molecule that are connected together by a bridging group.

* * * * *